US011132005B2

(12) United States Patent
Kageyama et al.

(10) Patent No.: US 11,132,005 B2
(45) Date of Patent: Sep. 28, 2021

(54) UNMANNED AERIAL VEHICLE ESCAPE SYSTEM, UNMANNED AERIAL VEHICLE ESCAPE METHOD, AND PROGRAM

(71) Applicant: RAKUTEN GROUP, INC., Tokyo (JP)

(72) Inventors: Takayuki Kageyama, Tokyo (JP); Hideaki Mukai, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 178 days.

(21) Appl. No.: 16/064,457

(22) PCT Filed: Dec. 29, 2015

(86) PCT No.: PCT/JP2015/086582
§ 371 (c)(1),
(2) Date: Jun. 21, 2018

(87) PCT Pub. No.: WO2017/115448
PCT Pub. Date: Jul. 6, 2017

(65) Prior Publication Data
US 2019/0002104 A1 Jan. 3, 2019

(51) Int. Cl.
G05D 1/10 (2006.01)
B64C 39/02 (2006.01)
H04N 7/18 (2006.01)
B64D 47/08 (2006.01)
B64C 13/20 (2006.01)
G06T 7/30 (2017.01)
G01P 5/00 (2006.01)

(52) U.S. Cl.
CPC ............ G05D 1/106 (2019.05); B64C 13/20 (2013.01); B64C 39/02 (2013.01); B64C 39/024 (2013.01);
(Continued)

(58) Field of Classification Search
CPC ......... B64C 39/24; B64C 13/20; B64C 39/02; B64C 2201/127; B64C 2201/141;
(Continued)

(56) References Cited

U.S. PATENT DOCUMENTS 9,247,385 B1* 1/2016 Heinen ................. H04W 4/185
9,710,709 B1* 7/2017 Beard ..................... G06T 7/248
(Continued)

FOREIGN PATENT DOCUMENTS

JP 2005-269413 A 9/2005
WO WO-2015179797 A1 * 11/2015 ............. B64C 27/00

OTHER PUBLICATIONS

English translation of the International Search Report for PCT/JP2015/086582 dated Mar. 15, 2016.

Primary Examiner — Nadeem Odeh
Assistant Examiner — Nicholas K Morgan
(74) Attorney, Agent, or Firm — HEA Law PLLC

(57) ABSTRACT

To avoid interfering with a participant when information on a venue of a competition or an event is provided by using an unmanned aerial vehicle, participant position information acquisition means of an unmanned aerial vehicle escape system acquires participant position information on a position of the participant in the venue of the competition or the event. Movement instruction means instructs an unmanned aerial vehicle for providing information on the venue to move to a position defined based on the participant position information. Layout information acquisition means acquires layout information on a layout of the venue. Escape destination determination means determines an escape destination of the unmanned aerial vehicle based on the participant position information and the layout information. Escape means causes the unmanned aerial vehicle to escape to the escape destination determined by the escape destination determination means.

17 Claims, 13 Drawing Sheets

(52) U.S. Cl.
CPC .............. *B64D 47/08* (2013.01); *G01P 5/00*
(2013.01); *G06T 7/30* (2017.01); *H04N 7/183*
(2013.01); *H04N 7/185* (2013.01); *B64C*
*2201/127* (2013.01); *B64C 2201/141* (2013.01)

(58) Field of Classification Search
CPC ... B64C 2201/145; B64C 39/028; G06T 7/30;
G05D 1/106; G05D 1/101; B64D 47/08;
G01P 5/00; H04N 7/183; H04N 7/185;
G08G 5/0069
See application file for complete search history.

(56) References Cited

U.S. PATENT DOCUMENTS

| | | | |
|---|---|---|---|
| 9,769,387 B1* | 9/2017 | Beard | G06K 9/0063 |
| 2010/0042269 A1* | 2/2010 | Kokkeby | G01S 3/7864 |
| | | | 701/3 |
| 2011/0295569 A1* | 12/2011 | Hamke | G01P 5/00 |
| | | | 703/2 |
| 2014/0316614 A1 | 10/2014 | Newman | |
| 2015/0134143 A1* | 5/2015 | Willenborg | G05D 1/0094 |
| | | | 701/2 |
| 2015/0350614 A1* | 12/2015 | Meier | G06K 9/0063 |
| | | | 348/144 |
| 2015/0370250 A1 | 12/2015 | Bachrach et al. | |
| 2016/0018822 A1* | 1/2016 | Nevdahs | G05D 1/08 |
| | | | 701/26 |
| 2016/0054737 A1* | 2/2016 | Soll | H04N 5/77 |
| | | | 701/3 |
| 2016/0327950 A1* | 11/2016 | Bachrach | G06F 3/00 |
| 2017/0166299 A1* | 6/2017 | Fujimura | G06K 9/00221 |
| 2018/0280780 A1* | 10/2018 | Nakao | H04N 5/247 |

* cited by examiner

FIG.4
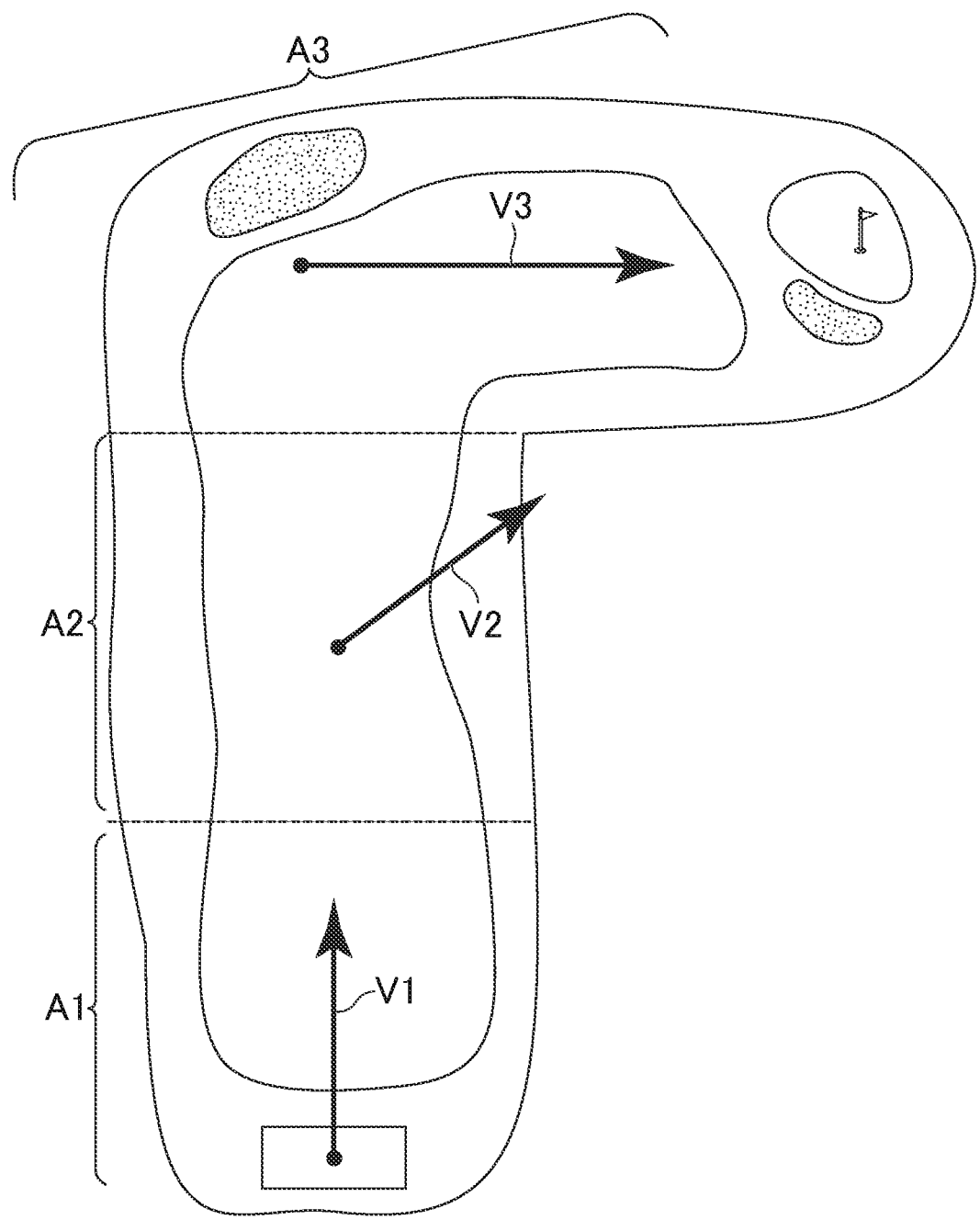
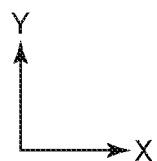

FIG.13

| PRIORITY | ESCAPE DIRECTION |
|---|---|
| 1 | UPPER DIRECTION |
| 2 | BACK OF PLAYER |
| 3 | LANDING |
| 4 | DIRECTION FROM PLAYER TOWARD UNMANNED AERIAL VEHICLE |
| ⋮ | ⋮ |

UNMANNED AERIAL VEHICLE ESCAPE SYSTEM, UNMANNED AERIAL VEHICLE ESCAPE METHOD, AND PROGRAM

CROSS REFERENCE TO RELATED APPLICATIONS

This application is a National Stage of International Application No. PCT/JP2015/086582 filed on Dec. 29, 2015. The contents of the above document is incorporated herein by reference in its entirety.

TECHNICAL FIELD

The present invention relates to an unmanned aerial vehicle escape system, an unmanned aerial vehicle escape method, and a program.

BACKGROUND ART

Hitherto, there has been known a technology of providing information on any place by using an unmanned aerial vehicle. For example, in Patent Literature 1, there is described a system configured to cause an unmanned aerial vehicle to fly in accordance with a predetermined flight path and provide an image obtained by photographing, for example, a house or a building from the sky with a camera.

Citation List

Patent Literature

[Patent Literature 1] JP 2005-269413 A

SUMMARY OF INVENTION

Technical Problem

When information on a competition or an event is provided by using an unmanned aerial vehicle, the unmanned aerial vehicle may interfere with participants, and thus does not preferably stay at the same place in some cases. For example, in a case where an unmanned aerial vehicle photographs the situation of a golf course in which a golf competition is held, the unmanned aerial vehicle may be hit by a ball when a player is photographed from a flying-out direction of the ball. Further, for example, when the unmanned aerial vehicle photographs an image near a player, the player may not be able to concentrate on hitting a shot due to the rotation sound of a propeller. Further, for example, when a player has addressed the ball, and then the unmanned aerial vehicle has photographed the player from the front direction thereof to enter the field of view of the player, the player may not be able to concentrate on hitting a shot by being distracted by the unmanned aerial vehicle.

The present invention has been made in view of the above-mentioned problems, and an object thereof is to avoid interfering with a participant when providing information on a venue of a competition or an event by using an unmanned aerial vehicle.

Solution to Problem

In order to solve the above-mentioned problems, an unmanned aerial vehicle escape system according to one embodiment of the present invention includes: participant position information acquisition means for acquiring participant position information on a position of a participant in a venue of a competition or an event; movement instruction means for instructing an unmanned aerial vehicle for providing information on the venue to move to a position defined based on the participant position information; layout information acquisition means for acquiring layout information on a layout of the venue; escape destination determination means for determining an escape destination of the unmanned aerial vehicle based on the participant position information and the layout information; and escape means for causing the unmanned aerial vehicle to escape to the escape destination determined by the escape destination determination means.

An unmanned aerial vehicle escape method according to one embodiment of the present invention includes: a participant position information acquisition step of acquiring participant position information on a position of a participant in a venue of a competition or an event; a movement instruction step of instructing an unmanned aerial vehicle for providing information on the venue to move to a position defined based on the participant position information; a layout information acquisition step of acquiring layout information on a layout of the venue; an escape destination determination step of determining an escape destination of the unmanned aerial vehicle based on the participant position information and the layout information; and an escape step of causing the unmanned aerial vehicle to escape to the escape destination determined in the escape destination determination step.

A program according to one embodiment of the present invention causes a computer to function as: participant position information acquisition means for acquiring participant position information on a position of a participant in a venue of a competition or an event; movement instruction means for instructing an unmanned aerial vehicle for providing information on the venue to move to a position defined based on the participant position information; layout information acquisition means for acquiring layout information on a layout of the venue; escape destination determination means for determining an escape destination of the unmanned aerial vehicle based on the participant position information and the layout information; and escape means for causing the unmanned aerial vehicle to escape to the escape destination determined by the escape destination determination means.

Further, an information storage medium according to one embodiment of the present invention is a computer-readable information storage medium having the above-mentioned program stored thereon.

Further, in one aspect of the present invention, the layout information associates each of a plurality of positions in the venue with a reference direction for determining the escape destination, and the escape destination determination means is configured to determine the escape destination based on the reference direction associated with the position of the participant.

Further, in one aspect of the present invention, a competition in which the participant hits an object is held in the venue, the reference direction includes an estimated flying-out direction in which the object is estimated to fly out from each position in the venue, and the escape destination determination means is configured to determine the escape destination based on the estimated flying-out direction associated with the position of the participant.

Further, in one aspect of the present invention, the reference direction includes an estimated line-of-sight direction in which the participant is estimated to look at each position in the venue, and the escape destination determination means is configured to determine the escape destination based on the estimated line-of-sight direction associated with the position of the participant.

Further, in one aspect of the present invention, the layout information defines a plurality of escape destination candidate positions serving as escape destination candidates, and the escape destination determination means is configured to determine, as the escape destination, an escape destination candidate within a predetermined distance from a position of the unmanned aerial vehicle among the plurality of escape destination candidate positions.

Further, in one aspect of the present invention, the escape destination determination means is configured to determine, as the escape destination, a position that is defined based on the layout information and is a predetermined distance or more away from the position of the participant.

Further, in one aspect of the present invention, the unmanned aerial vehicle includes a camera configured to photograph the participant, the unmanned aerial vehicle escape system further includes line-of-sight direction estimation means for estimating a line-of-sight direction of the participant based on an image photographed by the camera, and the escape destination determination means is configured to determine the escape destination based on the line-of-sight direction estimated by the line-of-sight direction estimation means.

Further, in one aspect of the present invention, the escape destination determination means is configured to determine, as the escape destination, a position that is defined based on the layout information and is in a direction from the participant toward the unmanned aerial vehicle.

Further, in one aspect of the present invention, the unmanned aerial vehicle escape system further includes wind information acquisition means for acquiring wind information on at least one of a wind direction or wind speed of the venue, and the escape destination determination means is configured to determine the escape destination based on the wind information.

Further, in one aspect of the present invention, the escape destination determination means is configured to determine whether there is landing space under the unmanned aerial vehicle, and determine the determined landing space as the escape destination.

Further, in one aspect of the present invention, the escape destination determination means is configured to determine escape directions that enable escape of the unmanned aerial vehicle from among a plurality of escape directions with priorities, and determine the escape destination based on an escape direction with a highest priority from among the escape directions that are determined to enable escape of the unmanned aerial vehicle.

Further, in one aspect of the present invention, the escape means is configured to cause the unmanned aerial vehicle to stay at a current location when the escape destination determination means determines that there is no escape direction that enables escape of the unmanned aerial vehicle.

Further, in one aspect of the present invention, the unmanned aerial vehicle escape system further includes state determination means for determining whether the competition or the event has entered a given progress state based on at least one of a state detected by the unmanned aerial vehicle, an operation input to a terminal, the participant position information, or a current time, and the escape means is configured to cause the unmanned aerial vehicle to escape when the state determination means determines that the given progress state has been entered.

Advantageous Effects of Invention

According to the present invention, it is possible to avoid interfering with the participant when providing the information on the venue of the competition or the event by using the unmanned aerial vehicle.

BRIEF DESCRIPTION OF DRAWINGS

FIG. 4 is a diagram for illustrating an example of layout information.

FIG. 13 is a table for showing a priority of an escape direction.

DESCRIPTION OF EMBODIMENTS

[1. Hardware Configuration of Unmanned Aerial Vehicle Escape System]

Figure 1:
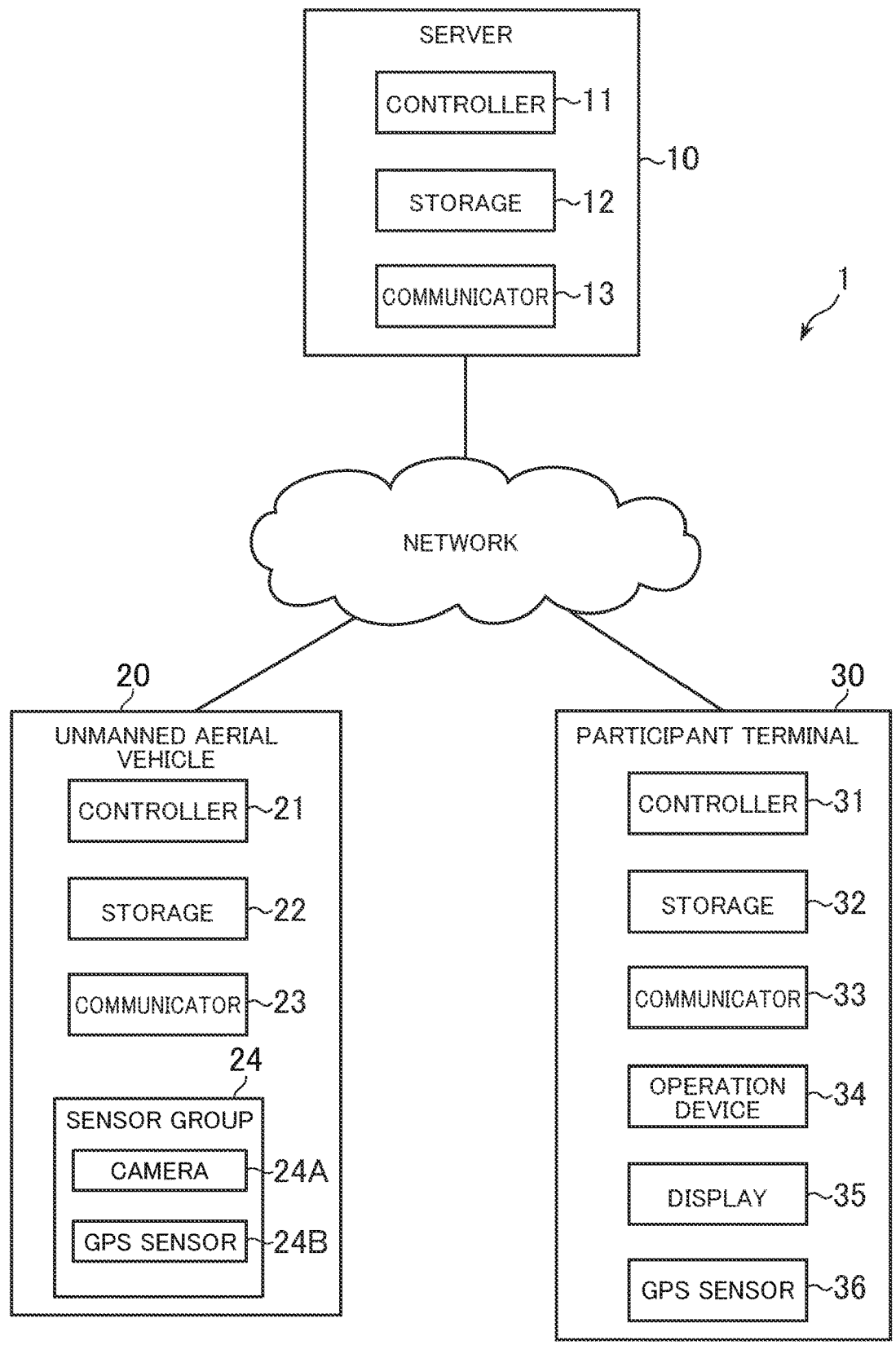
FIG. 1 is a diagram for illustrating a hardware configuration of an unmanned aerial vehicle escape system.

In the following, a description is given of an unmanned aerial vehicle escape system according to an exemplary embodiment of the present invention. FIG. 1 is a diagram for illustrating a hardware configuration of the unmanned aerial vehicle escape system. As illustrated in FIG. 1, an unmanned aerial vehicle escape system 1 includes a server 10, an unmanned aerial vehicle 20, and a participant terminal 30. The server 10, the unmanned aerial vehicle 20, and the participant terminal 30 are connected to one another via a network so that those components can communicate data to one another. In FIG. 1, the numbers of servers 10, unmanned aerial vehicles 20, and participant terminals 30 are each one, but the number of each of those components may be two or more.

The server 10 is a server computer. The server 10 includes a controller 11, a storage 12, and a communicator 13. The controller 11 includes, for example, one or more microprocessors. The controller 11 executes processing in accordance with programs and data stored in the storage 12. The storage 12 includes a main memory and an auxiliary memory. For example, the main memory is a volatile memory, for example, a RAM, and the auxiliary memory is a non-volatile memory such as a hard disk drive or a flash memory. The communicator 13 includes a network card for wired communication or wireless communication. The communicator 13 performs data communication via the network.

The unmanned aerial vehicle 20 is an aerial vehicle that does not accommodate a person, and is, for example, an unmanned aerial vehicle (so-called drone) driven by a battery or an unmanned aerial vehicle driven by an engine. The unmanned aerial vehicle 20 includes a controller 21, a storage 22, a communicator 23, and a sensor group 24. The unmanned aerial vehicle 20 includes common hardware components such as a propeller, a motor, and a battery, which are omitted here. Further, the hardware configurations of the controller 21, the storage 22, and the communicator 23 are similar to those of the controller 11, the storage 12, and the communicator 13, and thus a description thereof is omitted here. The unmanned aerial vehicle 20 is used for providing information on any place. Information to be provided is only required to be information detectable by the sensor group 24, and is, for example, an image (still image or moving image), sound, weather, temperature, or wind.

The sensor group 24 includes a camera 24A and a GPS sensor 24B. The camera 24A records an image (still image or moving image) photographed by an image pickup element such as a CCD image sensor or a CMOS image sensor as digital data. The GPS sensor 24B includes a receiver configured to receive signals from satellites, and detects positional information. Any sensor may be mounted on the unmanned aerial vehicle 20, and the sensor group 24 may include, for example, an infrared sensor, a sound sensor (microphone), an anemometer, an acceleration sensor, a gyro sensor, a geomagnetic sensor, an altitude sensor, a displacement sensor, or a temperature sensor.

The participant terminal 30 is a computer to be operated by a participant of a competition or an event, and is, for example, a mobile information terminal (including tablet computer), a cell phone (including smartphone), or a personal computer. The competition may be the one in which persons or teams compete with one another under a predetermined rule, and may be, for example, a sport or a race. For example, the competition is a ball game, for example, golf, skiing, shooting, track and field, or a car race. The event is, for example, a social event or an entertainment, and is, for example, a concert, an exhibition, or a festival. Participants are only required to be persons who are present in a venue of a competition or an event. In the case of a sport, persons such as players, team staff members, judges, and operation staff members correspond to the participants. In the case of an event, persons such as an organizer and operation staff members correspond to the participants. It is assumed that the organizer of a sport or an event, the central government, and the local government have permitted the unmanned aerial vehicle 20 to fly in the air above the venue.

The participant terminal 30 includes a controller 31, a storage 32, a communicator 33, an operation device 34, a display 35, and a GPS sensor 36. The hardware configurations of the controller 31, the storage 32, the communicator 33, and the GPS sensor 36 are similar to those of the controller 11, the storage 12, the communicator 13, and the GPS sensor 24B, and thus a description thereof is omitted here.

The operation device 34 is an input device to be used by a player for operation, and is, for example, a touch panel, a pointing device, for example, a mouse, or a keyboard. The operation device 34 transfers details of operation by the player to the controller 31. The display 35 is, for example, a liquid crystal display or an organic EL display. The display 35 displays a screen in accordance with an instruction given by the controller 31.

Programs and data to be described as being stored into the storages 12, 22, and 32 may be supplied thereto via a network. Further, the hardware configurations of the server 10, the unmanned aerial vehicle 20, and the participant terminal 30 are not limited to the above-mentioned examples, and various pieces of computer hardware can be applied. For example, each of the server 10, the unmanned aerial vehicle 20, the participant terminal 30 may include a reader (e.g., optical disc drive or memory card slot) configured to read a computer-readable information storage medium. In this case, programs and data stored in the computer-readable information storage medium may be supplied to each computer via the reader.

[2. Outline of Processing of Unmanned Aerial Vehicle Escape System]

Figure 2:
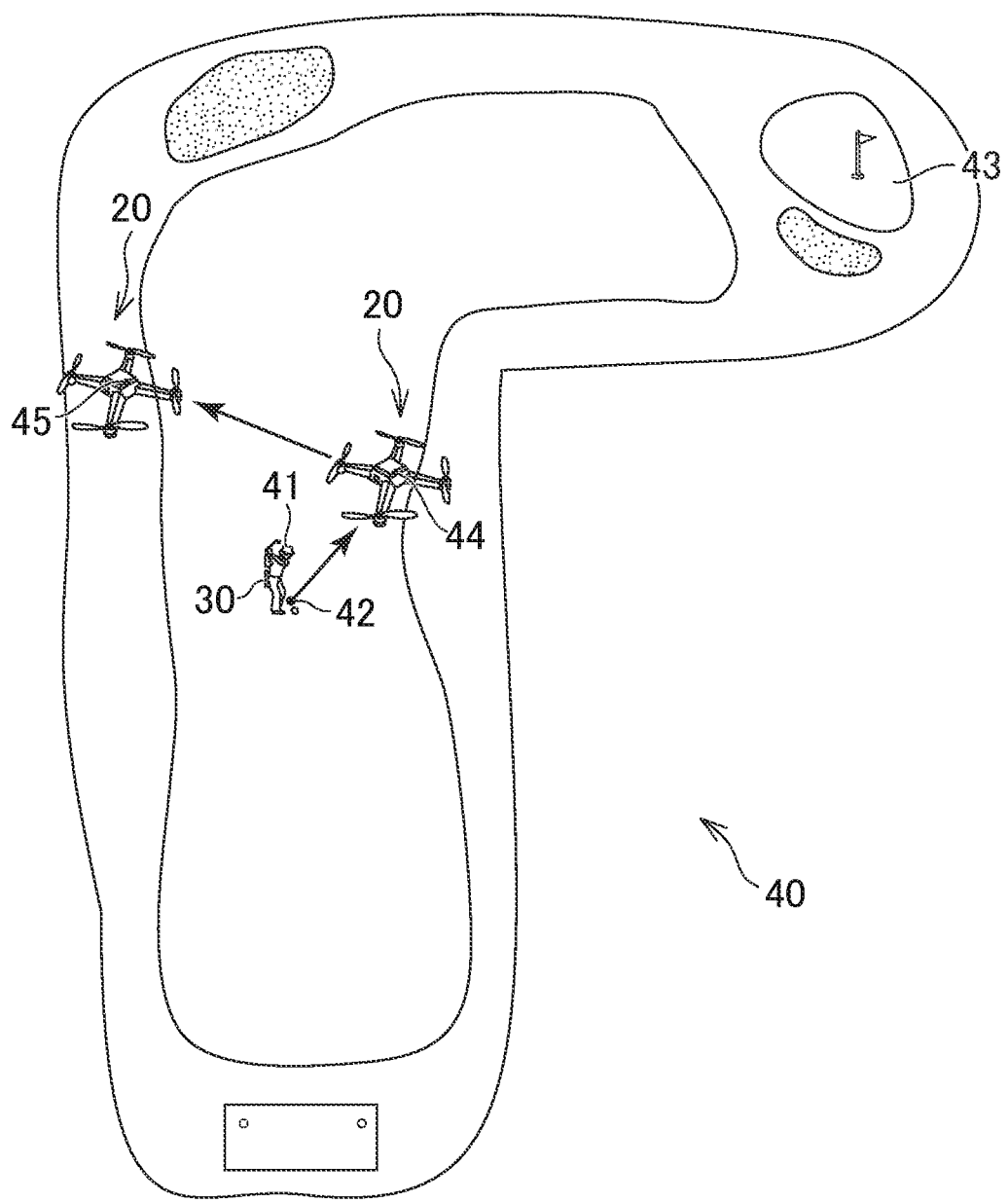
FIG. 2 is a diagram for illustrating an outline of processing of the unmanned aerial vehicle escape system.

FIG. 2 is a diagram for illustrating an outline of processing of the unmanned aerial vehicle escape system 1. In this embodiment, a description is given of a case of the unmanned aerial vehicle 20 photographing players participating in a golf competition and providing photographed images to viewers and the audience. That is, a description is given of a case in which golf, a golf course, and players are taken as examples of the competition, the venue, and the participants, respectively. As illustrated in FIG. 2, the unmanned aerial vehicle 20 flies near a player 41 playing a round in the golf course 40. It is assumed that the player 41 is standing near his or her own ball. The player 41 faces in a direction of a green 43 at a current position 42 in many cases, and thus when the unmanned aerial vehicle 20 photographs the player at a position 44, which is on a side of the green 43 as viewed from the current position 42 of the ball, the facial expression of the player before hitting a shot can be photographed successfully.

However, when the player 41 has addressed the ball and the unmanned aerial vehicle 20 continues to photograph an image at the position 44, the unmanned aerial vehicle 20 remains to be present in the field of view of the player 41, and thus the player 41 may not be able to concentrate on hitting a shot. Further, for example, the unmanned aerial vehicle 20 is present in the direction of the player 41 hitting a shot, and thus the unmanned aerial vehicle 20 may be hit by the ball. In other cases, for example, when the unmanned aerial vehicle 20 is hovering near the player 41, the player 41 may not concentrate on hitting a shot due to the rotation sound of a propeller. In view of the above, in this embodiment, the unmanned aerial vehicle 20 is configured to photograph an image at the position 44 until the player 41 addresses the ball, and to escape to a location 45, which does not interfere with the player 41, when the player 41 has addressed the ball. In the following, a description is given of details of this technology.

[3. Functions to be Implemented by Unmanned Aerial Vehicle Escape System]

Figure 3:
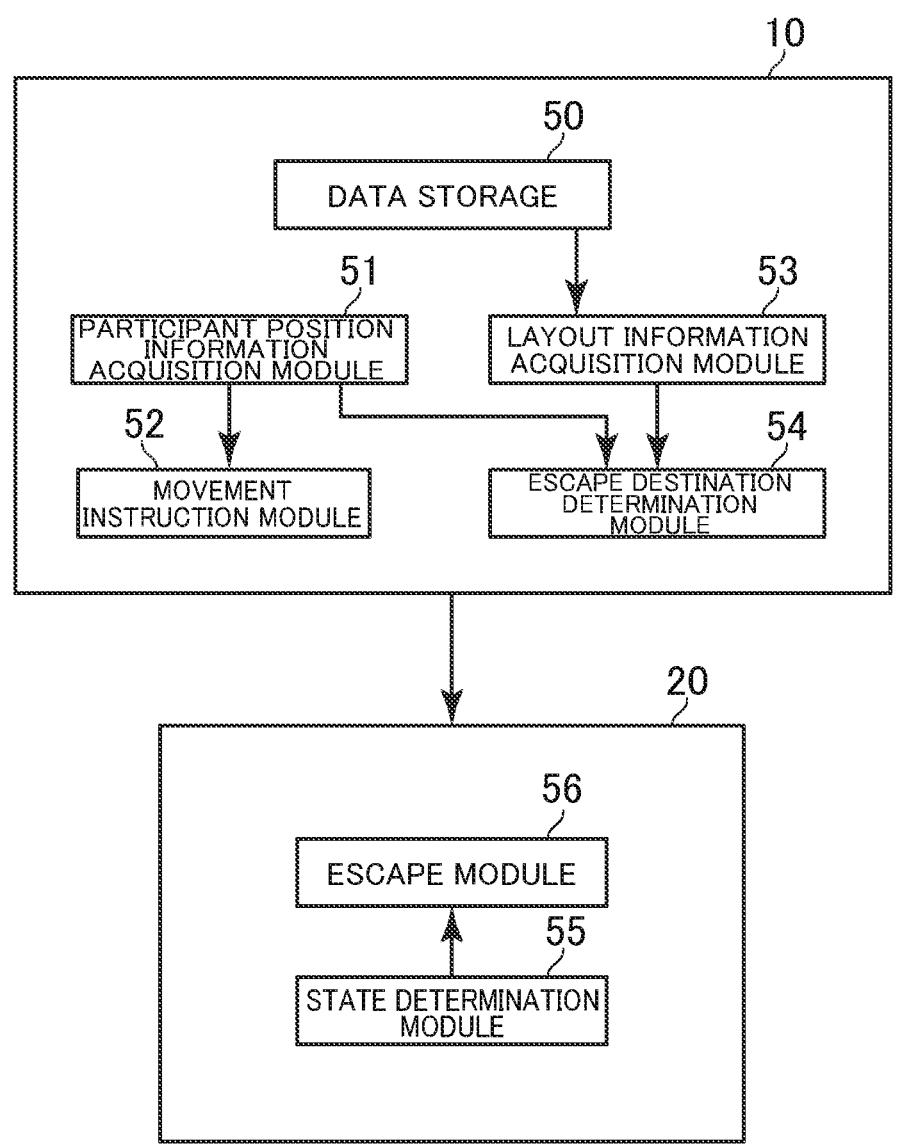
FIG. 3 is a functional block diagram for illustrating an example of functions to be implemented by the unmanned aerial vehicle escape system.

FIG. 3 is a functional block diagram for illustrating an example of functions to be implemented by the unmanned aerial vehicle escape system 1. As illustrated in FIG. 3, in this embodiment, a description is given of a case in which a data storage 50, a participant position information acquisition module 51, a movement instruction module 52, a layout information acquisition module 53, an escape destination determination module 54 are implemented by the server 10, and a state determination module 55 and an escape module 56 are implemented by the unmanned aerial vehicle 20.

[3-1. Data Storage]

The storage 12 mainly implements the data storage 50. The data storage 50 stores data for the unmanned aerial vehicle 20 to provide information or escape. Now, a description is given of a layout information database as data to be stored in the data storage 50. The layout information database stores layout information on a layout of a golf course. In this embodiment, a golf competition is held in a golf course, and thus the layout information database stores layout information for each golf course (for each hole).

FIG. 4 is a diagram for illustrating an example of the layout information. As illustrated in FIG. 4, the layout information is information indicating geography of a golf course and arrangement of areas such as a green, pin, fairway, rough, bunker, pond, obstacle, and out-of-bounds area. In this embodiment, the layout information is described as representing the layout of a golf course as a two-dimensional map, but the layout of a golf course may be represented by three-dimensional model data in a virtual three-dimensional space. In the example of FIG. 4, a description is given taking a golf course bending right in the middle as an example. An entire region outside the golf course is assumed to be an out-of-bounds area.

The layout information associates each of a plurality of positions in the golf course with a reference direction for determining an escape destination. The reference direction is a direction for determining the escape destination of the unmanned aerial vehicle 20. Golf, which is described as an example of the competition, is a competition in which players hit objects (balls), and thus an estimated flying-out direction, which is a direction of the object being estimated to fly out from each position in the golf course, is described as an example of the reference direction. The estimated flying-out direction is designated in advance by, for example, an administrator of the golf course. For example, the estimated flying-out direction is a direction of each position in the golf course pointing toward a target position. The target position is a position that enables the competition to progress advantageously for the player when the object reaches that position, and is, for example, a fairway or green. In this description, the estimated flying-out direction is described as a two-dimensional vector, and when the layout information is represented by a three-dimensional model, the estimated flying-out direction may be represented by a three-dimensional vector.

Now, a description is given of a case in which the golf course is divided into a plurality of areas, and the estimated flying-out direction is defined for each area. There may be two or more estimated line-of-sight directions for one area. For example, in the example of FIG. 4, the golf course is divided into three areas A1 to A3. The area A1 is a start area of the golf course, and for example, the front direction as viewed from a teeing ground is associated with an estimated flying-out direction V1. The area A2 is a middle area of the golf course, and for example, the direction of shortcutting from the area A2 to a green across the out-of-bounds area is associated with an estimated flying-out direction V2. The area A3 is an end area of the golf course, and the direction toward the green is associated with an estimated flying-out direction V3.

The data stored in the data storage 50 is not limited to the above-mentioned examples. For example, the data storage 50 may store association between coordinates of the golf course in the layout information and latitude/longitude information in the real space.

[3-2. Participant Position Information Acquisition Module]

The controller 11 mainly implements the participant position information acquisition module 51. The participant position information acquisition module 51 acquires participant position information on the position of a player in the golf course. The participant position information is only required to be information capable of identifying the position of a player, and now, a description is given of a case of using latitude/longitude information detected by the GPS sensor 36 as the participant position information. The latitude/longitude information is information for identifying a position in the north-south direction and a position in the east-west direction on the earth, and is, for example, represented by each numerical value of a degree, an arcminute, and an arc second. The participant position information may be information (e.g., wireless LAN access point information) on a base station that the communicator 33 of the participant terminal 30 wirelessly communicates to/from.

[3-3. Movement Instruction Module]

The controller 11 mainly implements the movement instruction module 52. The movement instruction module 52 instructs the unmanned aerial vehicle 20 for providing information on the golf course to move to a position determined based on the participant position information. The information may be provided to a player (example of participant), or may be provided to a person other than the player. That is, the information may be provided to any person, and the unmanned aerial vehicle 20 may be configured to provide information to the player, or may be configured to provide information to a person other than the player.

The position determined based on the participant position information is a position at which the unmanned aerial vehicle 20 acquires information, namely, a position having a predetermined relationship with the position indicated by the participant position information. In this embodiment, the position determined based on the participant position information is a position at which the unmanned aerial vehicle 20 is to photograph the player. This position is hereinafter referred to as a "movement destination" of the unmanned aerial vehicle 20. For example, a positional relationship between the position indicated by the participant position information and the movement destination of the unmanned aerial vehicle 20 may be stored in the data storage 50. This positional relationship may be represented by a mathematical expression or a table. The movement instruction module 52 instructs movement to a movement destination associated with the position indicated by the participant position information. For example, the movement instruction module 52 may determine a position within a predetermined distance from the position indicated by the participant position information as the movement destination of the unmanned aerial vehicle 20.

Further, for example, the above-mentioned positional relationship may be determined in the layout information. That is, the movement instruction module 52 may determine the movement destination of the unmanned aerial vehicle 20 based on the participant position information and the layout information. For example, when the estimated flying-out direction is defined in the layout information as in this embodiment, the movement instruction module 52 may determine, as the movement destination, a position a predetermined distance away from the position indicated by the participant position information in an estimated flying-out direction associated with the position.

The movement destination may indicate only the two-dimensional position like the latitude/longitude information, or may indicate a three-dimensional position including the altitude. When the movement destination indicates only the two-dimensional position like the latitude/longitude information, the unmanned aerial vehicle 20 moves to a predetermined altitude position. The altitude may be a fixed value, or may be defined based on the layout information.

[3-4. Layout Information Acquisition Module]

The controller 11 mainly implements the layout information acquisition module 53. The layout information acquisition module 53 acquires layout information on the layout of the golf course. The layout information acquisition module 53 acquires the layout information stored in the data storage 50. The layout information is stored in the data storage 50 for each of a plurality of golf courses, and thus the layout information acquisition module 53 identifies a golf course accommodating a player based on the participant position information, and acquires the layout information on the identified golf course.

[3-5. Escape Destination Determination Module]

The controller 11 mainly implements the escape destination determination module 54. The escape destination determination module 54 determines the escape destination of the unmanned aerial vehicle 20 based on the participant position information and the layout information. In this embodiment, the estimated flying-out direction is defined for each position of the golf course, and thus the escape destination determination module 54 determines the escape destination based on the estimated flying-out direction (example of reference direction) associated with the position of the player.

Figure 5:
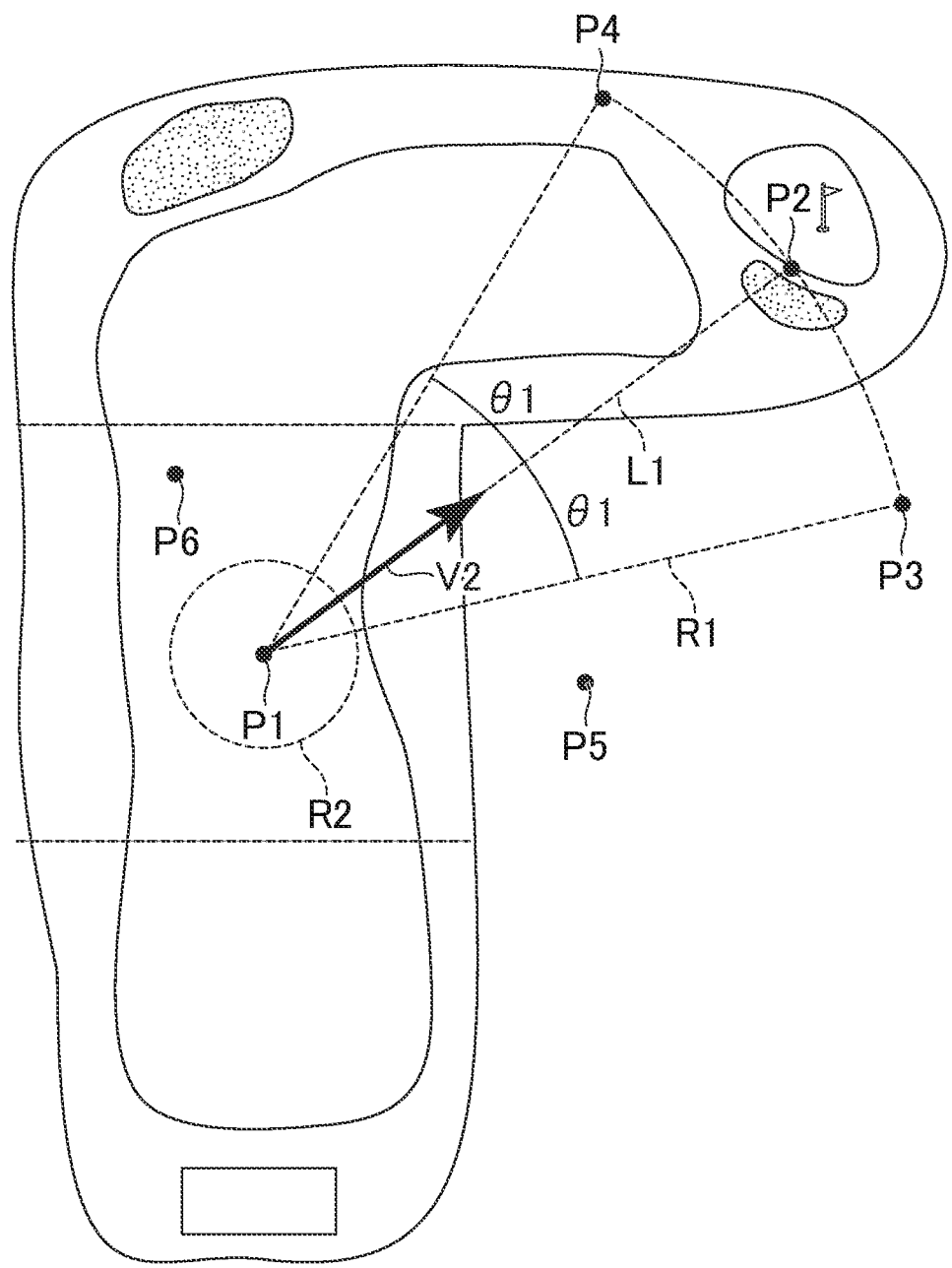
FIG. 5 is an explanatory diagram of a method of determining an escape destination.

FIG. 5 is an explanatory diagram of a method of determining an escape destination. As illustrated in FIG. 5, the escape destination determination module 54 determines an estimated hit-ball region R1 that the hit ball may reach based on a position P1 of the player indicated by the participant position information and the estimated flying-out direction V2 associated with the area A2 including the position P1. A relationship among the position P1, the estimated flying-out direction V2, and the estimated hit-ball region R1 is stored in the data storage 50 in advance. This relationship may be represented by a mathematical expression or a table. The escape destination determination module 54 acquires the estimated hit-ball region R1 associated with the position P1 and the estimated flying-out direction V2.

For example, the escape destination determination module 54 sets, as the estimated hit-ball region R1, a region passed by a straight line L1, which connects the position P1 and a position P2 a predetermined distance away from the position P1 in the estimated flying-out direction V2, when the line segment L1 is rotated in clockwise and counterclockwise directions about the position P1 by an angle θ1. The estimated hit-ball region R1 is a region enclosed by the positions P1, P3, and P4. The escape destination determination module 54 determines any position outside the estimated hit-ball region R1 as the escape destination.

In this embodiment, the escape destination determination module 54 determines, as the escape destination, a position (e.g., position outside estimated hit-ball region R1) that is determined based on the layout information and is a predetermined distance or more away from the position P1 indicated by the participant position information. For example, the escape destination determination module 54 identifies a player region R2, which is a circle having a predetermined radius centered around the position P1. Then, the escape destination determination module 54 determines a position outside both of the estimated hit-ball region R1 and the player region R2 as the escape destination. A region outside both of the estimated hit-ball region R1 and the player region R2 is hereinafter referred to as an "escape destination candidate region".

The escape destination determination module 54 may select any position in the escape destination candidate region as the escape destination, and for example, the escape destination determination module 54 may randomly select one position from the escape destination candidate region, or may select a position within a predetermined distance from the movement destination of the unmanned aerial vehicle 20. Further, for example, the escape destination determination module 54 may determine, as the escape destination, a position closest to the movement destination of the unmanned aerial vehicle 20 within the escape destination candidate region. Alternatively, for example, the escape destination determination module 54 may determine, as the escape destination, a position on a side opposite to the estimated flying-out direction V2 within the escape destination candidate region.

Although a position P5 indicated in FIG. 5 is within the escape destination candidate region, the position P5 is an out-of-bounds area, and the unmanned aerial vehicle 20 may collide with an obstacle, for example, a tree. Thus, the escape destination determination module 54 may determine a position P6 on a fairway, which does not include an obstacle, as the escape destination. The escape destination determination module 54 may identify a location that includes an obstacle based on the layout information, or may identify a location that includes an obstacle based on a result of detection by the sensor group 24 of the unmanned aerial vehicle 20 (e.g., image photographed by camera 24A or result of detecting by infrared sensor whether or not there is object).

Further, the escape destination may indicate only a two-dimensional position like latitude/longitude information, or may indicate a three-dimensional position including an altitude. When the movement destination indicates only a two-dimensional position like latitude/longitude information, the unmanned aerial vehicle 20 moves to a predetermined altitude position. The altitude may be a fixed value, or may be defined based on the layout information. For example, when the out-of-bounds area is allowed to be set as the escape destination, the altitude of the escape destination may be set so that a more sufficient level of altitude is ensured compared to a case in which the escape destination is a position on the fairway.

[3-6. State Determination Module]

The controller 21 mainly implements the state determination module 55. The state determination module 55 determines whether or not the golf competition has entered a given progress state. The given progress state refers to a state that requires the unmanned aerial vehicle 20 to escape, and is a state in which the unmanned aerial vehicle 20 interferes with the player when the unmanned aerial vehicle 20 stays at the current location. For example, the given progress state refers to a state of the player performing a predetermined motion (e.g., hitting shot) or a state of the player performing a preliminary motion (e.g., addressing ball) for performing a predetermined motion. Now, a description is given of a case in which the player addressing the ball corresponds to the given progress state.

In this embodiment, a description is given of a case in which the state determination module 55 determines whether or not the golf competition has entered the given progress state based on the state detected by the unmanned aerial vehicle 20. The state detected by the unmanned aerial vehicle 20 is only required to be a state in the golf course, and is only required to be information detectable by the sensor group 24. Now, a description is given of a case in which an image photographed by the camera 24A corresponds to the state detected by the unmanned aerial vehicle 20.

For example, the state determination module 55 determines whether or not a player who has addressed the ball is in the photographed image by performing template matching through use of a template image representing the posture of a player at the time of the given progress state. The template image represents the shape of a human holding a golf club, and is stored in the data storage 50 in advance. A known technique is applicable to the template matching itself. The photographed image is used as an image to be inspected. For example, the state determination module 55 calculates a degree of similarity between each region of the photographed image and the template image by pattern matching. As the similarity degree becomes higher, those images are indicated to be more similar to each other, and as the similarity degree becomes lower, those images are indicated to be less similar to each other. The similarity degree may be calculated based on a difference between pixel values of those images. For example, as the difference between pixel values becomes smaller, the similarity degree becomes higher. The state determination module 55 determines that the player has addressed the ball and entered the given progress state when the similarity degree is equal to or larger than a threshold value.

[3-7. Escape Module]

The controller 21 mainly implements the escape module 56. The escape module 56 causes the unmanned aerial vehicle 20 to escape to an escape destination determined by the escape destination determination module 54. A method of causing the unmanned aerial vehicle 20 to move to the designated position may be a known automatic maneuvering method. For example, the escape module 56 may cause the unmanned aerial vehicle 20 to fly automatically by setting the latitude/longitude information detected by the GPS sensor 24B as the current location and the latitude/longitude information on the escape destination as the destination location. The unmanned aerial vehicle 20 controls the propeller under the control by the escape module 56 so that a direction from the current location toward the destination location is a progress direction. The progress direction may be determined through use of a direction obtained by a geomagnetic sensor of the sensor group 24.

In this embodiment, when the state determination module 55 determines that the predetermined progress state has been entered, the escape module 56 causes the unmanned aerial vehicle 20 to escape. That is, the escape module 56 causes the unmanned aerial vehicle 20 to continuously photograph an image at a position designated by the movement instruction module 52 without escaping unless the state determination module 55 determines that the given progress state has been entered, and causes the unmanned aerial vehicle 20 to escape when the state determination module 55 determines that the given progress state has been entered.

[4. Processing to be Executed by Unmanned Aerial Vehicle Escape System]

Figure 6:
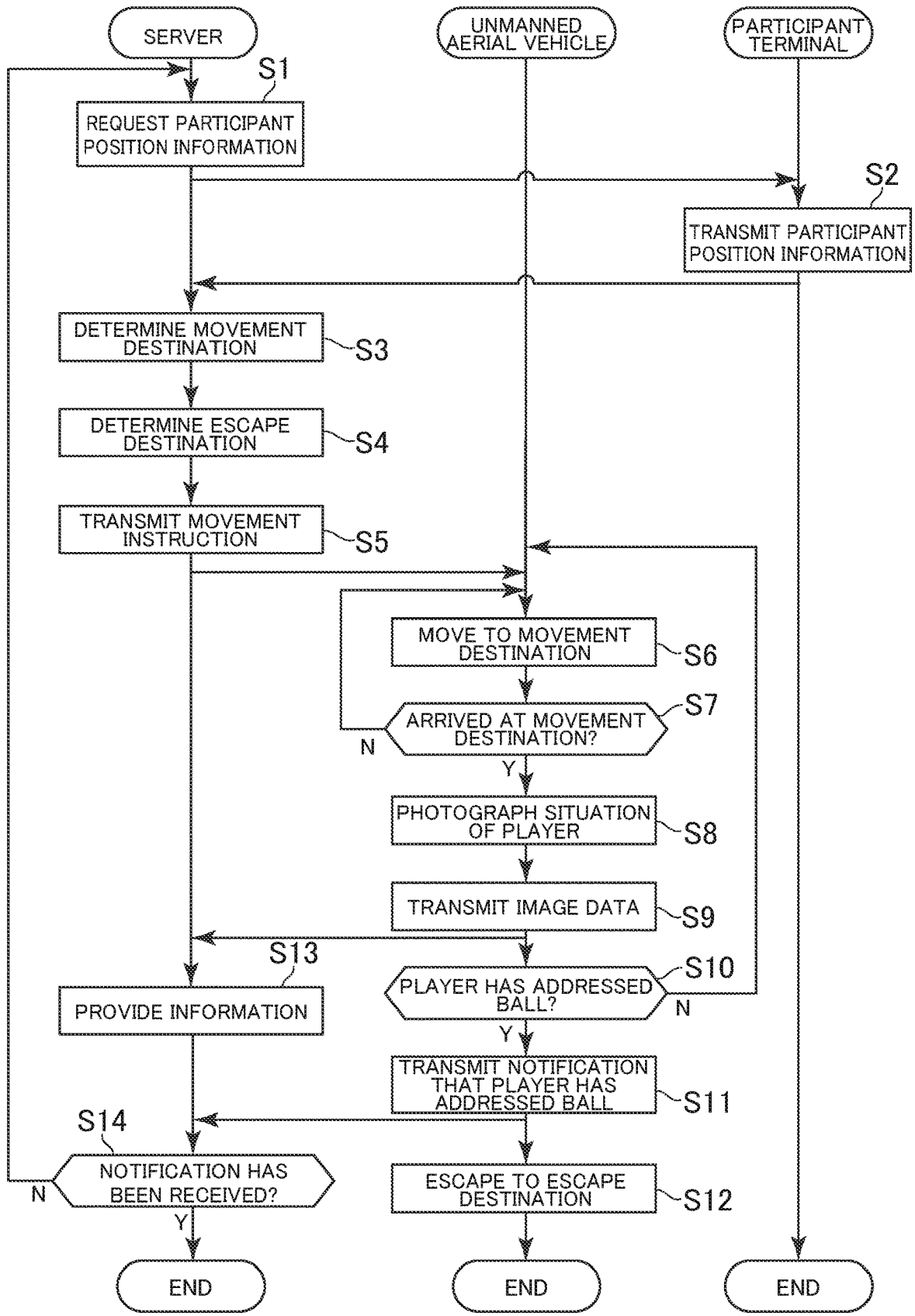
FIG. 6 is a flowchart for illustrating an example of processing to be executed by the unmanned aerial vehicle escape system.

FIG. 6 is a flowchart for illustrating an example of processing to be executed by the unmanned aerial vehicle escape system 1. The processing illustrated in FIG. 6 is executed by the controllers 11, 21, and 31 operating in accordance with programs stored in the storages 12, 22, and 32, respectively. In this embodiment, the functional blocks illustrated in FIG. 4 are implemented through execution of processing described below.

As illustrated in FIG. 6, first, the controller 11 of the server 10 requests the participant terminal 30 for the participant position information (Step S1). An IP address of the participant terminal 30 is stored in the storage 12 in advance, and the participant position information is requested through transmission of data of a predetermined format to the IP address.

The participant terminal 30, which has received the request, causes the controller 31 to transmit the participant position information detected by the GPS sensor 36 to the server 10 (Step S2). In Step S2, the controller 31 transmits the latitude/longitude information detected by the GPS sensor 36 based on signals from satellites as the participant position information.

The server 10, which has received the participant position information, causes the controller 11 to determine the movement destination of the unmanned aerial vehicle 20 based on the received participant position information (Step S3). In Step S3, the controller 11 determines, as the movement destination, latitude/longitude information away from latitude/longitude information of the participant position information in a predetermined direction.

The controller 11 determines the escape destination of the unmanned aerial vehicle 20 based on the received participant position information and the layout information stored in the storage 12 (Step S4). In Step S4, first, the controller 11 converts the latitude/longitude information of the participant position information into coordinates of the layout information, and acquires the estimated flying-out direction associated with those coordinates. The controller 11 calculates the estimated hit-ball region R1 based on the position indicated by the participant position information and the estimated flying-out direction. Further, the controller 11 calculates the player region R2 based on the participant position information. The controller 11 selects a position in the escape destination candidate region that is outside the estimated hit-ball region R1 and the player region R2, and converts the position into the latitude/longitude information, to thereby acquire the escape destination.

The controller 11 transmits a movement instruction to the unmanned aerial vehicle 20 so that the unmanned aerial vehicle 20 moves to the movement destination determined in Step S3 (Step S5). In this embodiment, the server 10 determines the escape destination in Step S4, and thus it is assumed that the movement instruction contains both of the movement destination and the escape destination. The movement instruction is only required to be given in a predetermined data format.

When the unmanned aerial vehicle 20 has received the movement instruction, the controller 21 causes the unmanned aerial vehicle 20 to move to the movement destination determined in Step S3 (Step S6). In Step S6, the controller 21 sets the movement destination determined in Step S3 as the destination location of an automatic maneuvering algorithm, to thereby start movement of the unmanned aerial vehicle 20.

The controller 21 determines whether or not the unmanned aerial vehicle 20 has arrived at the movement destination (Step S7). In Step S7, the controller 21 determines whether or not the latitude/longitude information detected by the GPS sensor 24B and the latitude/longitude information of the movement destination match each other. When the unmanned aerial vehicle 20 is determined to have arrived at the movement destination (Step S7: Y), the controller 21 photographs the situation of the player with the camera 24A (Step S8), and transmits image data to the server 10 (Step S9). The controller 21 may identify the player position by rotating at the movement destination while photographing an image with the camera 24A and subjecting the photographed image to human recognition processing. The controller 21 may adjust the direction of the unmanned aerial vehicle 20 so that a direction toward the identified position matches a photographing direction of the camera 24A. The image may be photographed in a moving image mode or a still image mode in Step S8.

The unmanned aerial vehicle 20 determines whether or not the player has addressed the ball based on the photographed image (Step S10). In Step S10, the controller 21 determines whether or not the player has addressed the ball by performing template matching between the photographed image and the template image representing the posture of the player addressing the ball.

When the player is determined to have addressed the ball (Step S10: Y), the controller 21 transmits a notification that the player has addressed the ball (Step S11), and causes the unmanned aerial vehicle 20 to the escape destination (Step S12). The notification of Step S11 is only required to be performed in a predetermined data format. In Step S12, the controller 21 sets the escape destination determined in Step S4 as the destination location of an automatic maneuvering algorithm, to thereby start movement of the unmanned aerial vehicle 20. On the contrary, when the player is not determined to have addressed the ball (Step S11: N), the processing returns to the processing of Step S6, and the notification of Step S11 is not transmitted.

When the server 10 has received image data transmitted in Step S9, the controller 11 provides information on players to, for example, the audience and viewers based on the received image data (Step S13). In Step S13, the controller 11 displays the photographed image on displays provided in audience seats, or streams a moving image via a network, to thereby provide information.

The controller 11 determines whether or not the notification that the player has addressed the ball has been received (Step S14). When the notification that the player has addressed the ball is not determined to have been received (Step S14: N), the processing returns to Step S1, and the participant position information is requested again. Through the execution of the processing of Step S1 and the subsequent steps again, for example, the movement destination or escape destination is updated even while the player is walking toward the position of his or her own ball, and thus the unmanned aerial vehicle 20 can move in such a manner as to follow the player, and the escape destination can also be updated to correspond to the latest participant position information. On the contrary, when the notification that the player has addressed the ball is determined to have been received (Step S14: Y), the processing ends.

With the unmanned aerial vehicle escape system 1 described above, when the unmanned aerial vehicle 20 photographs the player, the unmanned aerial vehicle 20 escapes to the escape destination, to thereby be able to avoid interfering with the player. In this respect, when the unmanned aerial vehicle 20 is caused to escape in a direction determined at random, escaping may interfere with the player depending on the layout of the golf course contrary to the intention (e.g., unmanned aerial vehicle escapes in direction in which player intends to hit ball). However, the escape destination is determined based on the participant position information and layout information, and thus the unmanned aerial vehicle 20 can be caused to escape to a location that depends on the current position of the player and the layout of the golf course, to thereby be able to increase the reliability of avoiding interfering with the player.

Further, the unmanned aerial vehicle 20 can escape in the direction that depends on the position of the player by determining the escape destination based on the reference direction associated with the position of the player, to thereby be able to further increase the reliability of avoiding interfering with the player.

Further, the reference direction is set to the estimated flying-out direction, to thereby be able to further increase the reliability of avoiding interfering with the player in a competition in which an object is hit like golf.

Further, the unmanned aerial vehicle 20 escapes to a position away from the player by setting the escape destination to the position a predetermined distance or more away from the player position, to thereby be able to avoid occurrence of a situation in which players cannot concentrate due to the rotation sound of the propeller.

Further, the unmanned aerial vehicle 20 can be caused to continuously photograph the player until the unmanned aerial vehicle 20 is required to escape by causing the unmanned aerial vehicle 20 to escape when the player has entered the given progress state, for example, addressed the ball, whereas the unmanned aerial vehicle 20 is caused to escape when the unmanned aerial vehicle 20 is required to escape, to thereby be able to avoid interfering with the player.

[5. Modification Examples]

The present invention is not limited to the embodiment described above, and can be modified suitably without departing from the spirit of the present invention.

Figure 7:
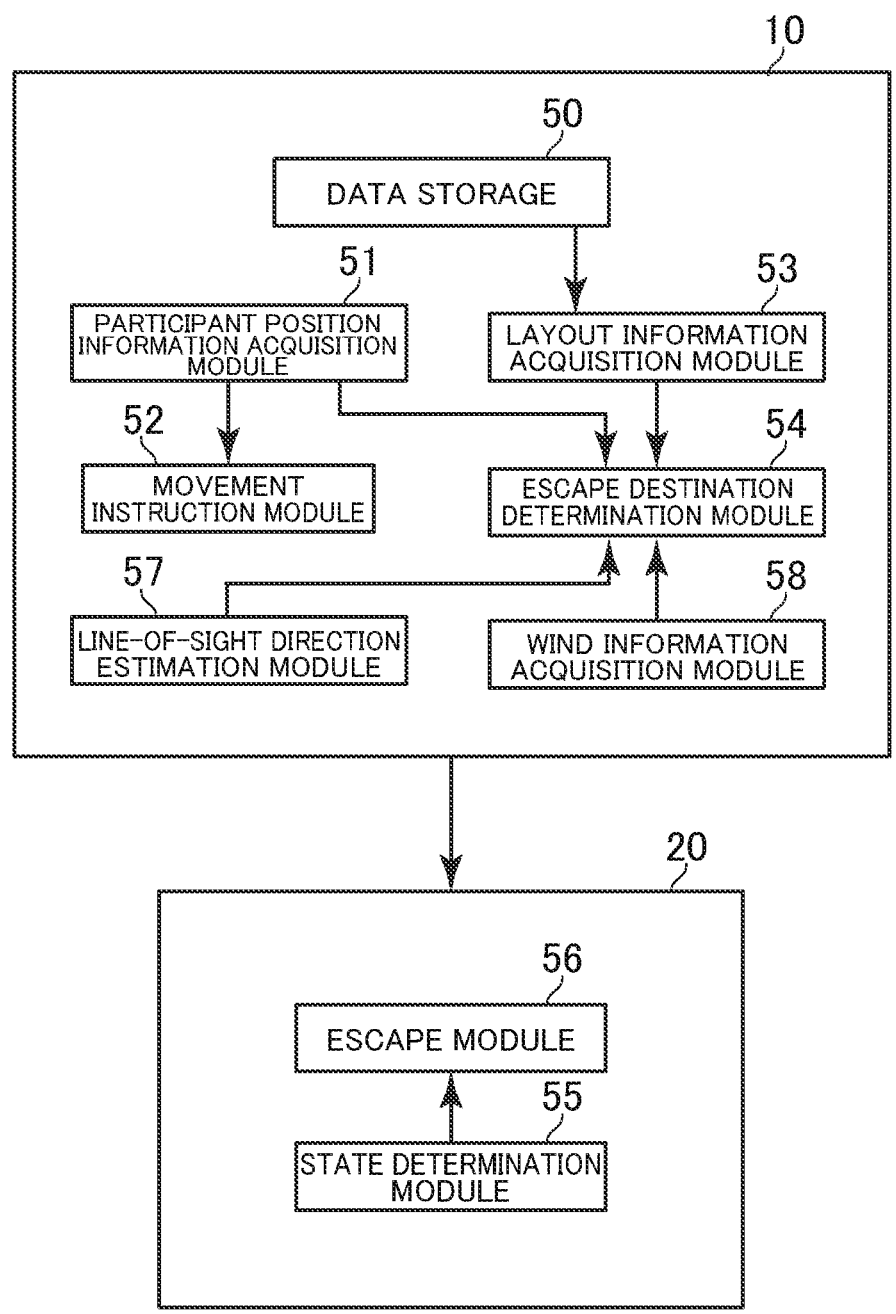
FIG. 7 is a functional block diagram in modification examples of the present invention.

FIG. 7 is a functional block diagram in modification examples of the present invention. As illustrated in FIG. 7, in the modification examples described below, a line-of-sight direction estimation module 57 and a wind information acquisition module 58 are implemented in addition to the functions of the embodiment. Now, a description is given of a case in which the server 10 implements those modules.

(1) For example, in the embodiment, the case in which the reference direction is the estimated flying-out direction of a hit ball has been described, but the player who has addressed the ball often faces in a direction other than the estimated flying-out direction. Thus, the reference direction may be an estimated line-of-sight direction in which the player is estimated to face at each position of the golf course in order to avoid the unmanned aerial vehicle 20 from entering the field of view of the player.

Figure 8:
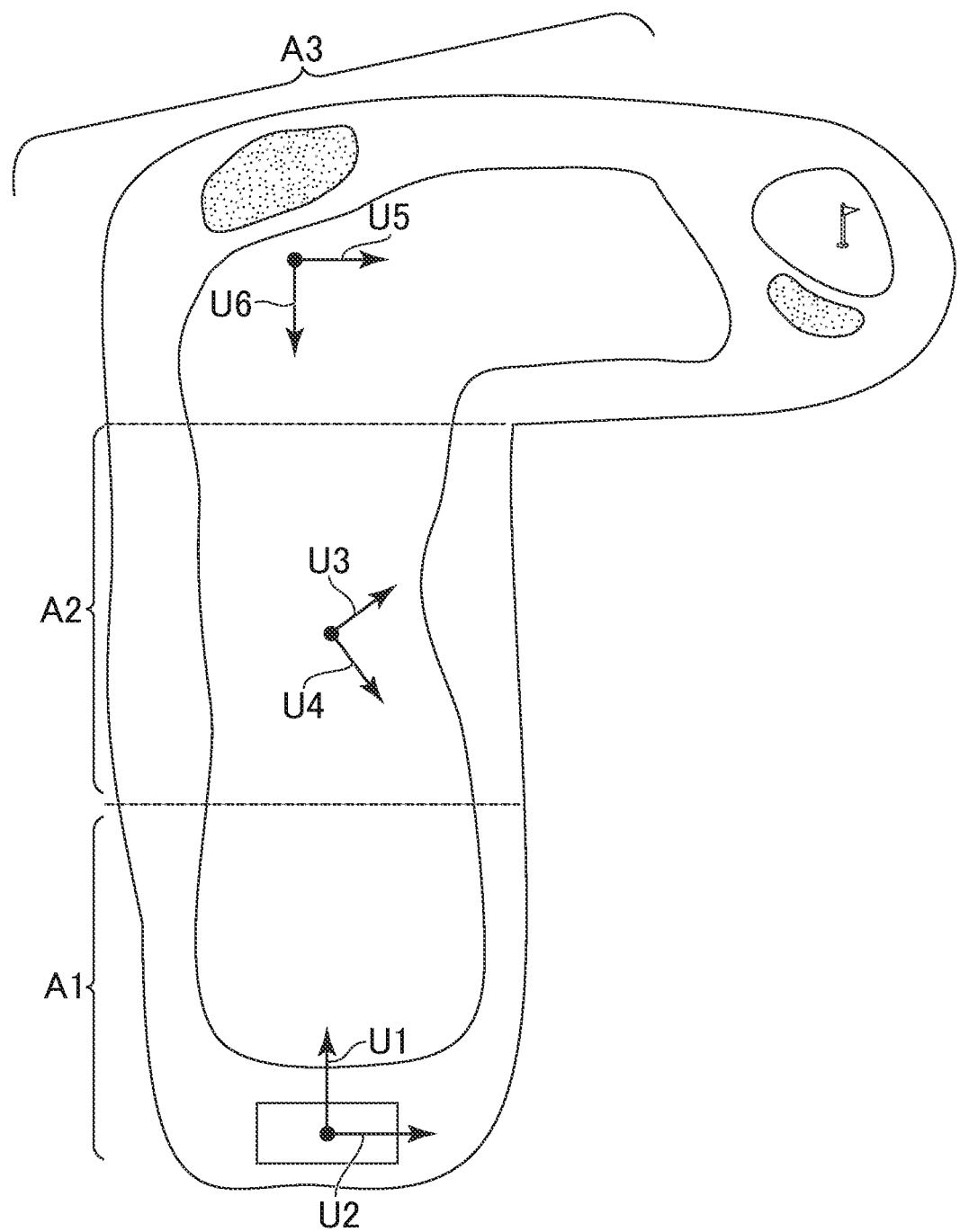
FIG. 8 is a diagram for illustrating an example of layout information in Modification Example (1) of the present invention.

FIG. 8 is a diagram for illustrating an example of layout information in Modification Example (1) of the present invention. As illustrated in FIG. 8, a description is given of a case in which the golf course is divided into the three areas A1 to A3 similarly to the embodiment. The estimated line-of-sight direction is specified in advance by, for example, the administrator of the golf course. For example, the estimated line-of-sight direction is a direction from each position in the golf course toward the target position, or a direction in which the body or face of the player faces when the player is hitting a shot toward the target position. The meaning of the target position may be similar to that of the embodiment. The following description is based on the assumption that the estimated line-of-sight direction is a two-dimensional vector, but when the layout information is represented as a 3D model, the estimated line-of-sight direction may be represented by a three-dimensional vector.

In the example of FIG. 8, two estimated line-of-sight directions are associated with each of the areas A1 to A3.

There may be one estimated line-of-sight direction or three or more estimated line-of-sight directions for one area. For example, an estimated line-of-sight direction U1, which is the same direction as the estimated flying-out direction V1, and an estimated line-of-sight direction U2, in which the body or face of the player faces when hitting a shot toward the estimated flying-out direction V1, are associated with the area A1. Further, for example, an estimated line-of-sight direction U3, which is the same direction as the estimated flying-out direction V2, and an estimated line-of-sight direction U4, in which the body or face of the player faces when hitting a shot toward the estimated flying-out direction V2, are associated with the area A2. Further, for example, an estimated line-of-sight direction U5, which is the same direction as the estimated flying-out direction V3, and an estimated line-of-sight direction U6, in which the body or face of the player faces when hitting a shot toward the estimated flying-out direction V3, are associated with the area A3.

As described above, in Modification Example (1), the estimated line-of-sight direction is defined for each position of the golf course, and thus the escape destination determination module 54 determines the escape destination based on the estimated line-of-sight direction associated with the position of the player.

Figure 9:
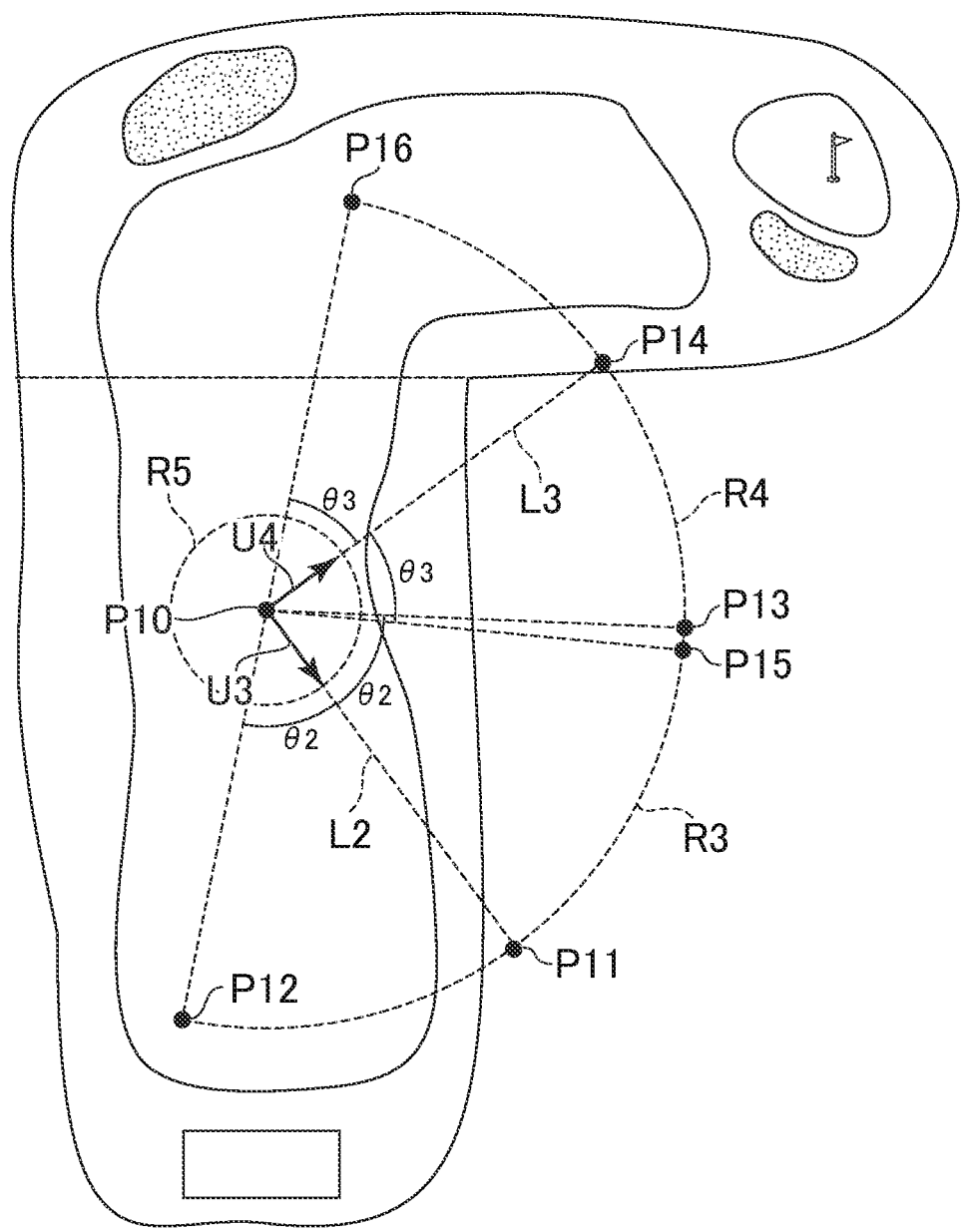
FIG. 9 is an explanatory diagram for illustrating a method of determining an escape destination in Modification Example (1).

FIG. 9 is an explanatory diagram of a method of determining an escape destination in Modification Example (1). As illustrated in FIG. 9, a description is given below of a case in which the escape destination determination module 54 determines estimated line-of-sight regions R3 and R4 at which the player may look based on a position P10 of the player indicated by the participant position information and the estimated line-of-sight directions U3 and U4 associated with the area A2 including the position P10. A relationship among the position P10, the estimated line-of-sight directions U3 and U4, and the estimated line-of-sight regions R3 and R4 is stored in the data storage in advance. This relationship may be represented by a mathematical expression or a table. The escape destination determination module 54 acquires the estimated line-of-sight regions R3 and R4 associated with the position P10 and the estimated line-of-sight directions U3 and U4.

For example, the escape destination determination module 54 sets, as the estimated line-of-sight region R3, a region passed by a line segment L2, which connects the position P10 and a position P11 a predetermined distance away from the position P10 in the estimated line-of-sight direction U3, when the line segment L2 is rotated in clockwise and counterclockwise directions about the position P10 by an angle θ2. The estimated line-of-sight region R3 is a region enclosed by the positions P10, P12, and P13. Similarly, the escape destination determination module 54 sets, as the estimated line-of-sight region R4, a region passed by a line segment L3, which connects the position P10 and a position P14 a predetermined distance away from the position P10 in the estimated line-of-sight direction U4, when the line segment L3 is rotated in clockwise and counterclockwise directions about the position P10 by an angle θ3. The estimated line-of-sight region R4 is a region enclosed by the positions P10, P15, and P16. The angles θ1 to θ3 may be the same or different from one another. Similarly, the line segments L1 to L3 may be the same or different from one another.

Also in Modification Example (1), similarly to the embodiment, the escape destination determination module 54 may identify a player region R5, which is a circle having a predetermined radius centered around the position P10. Then, the escape destination determination module 54 determines a position outside all of the estimated line-of-sight regions R3 and R4 and the player region R5 as the escape destination. That is, in Modification Example (1), a region outside all of the estimated line-of-sight regions R3 and R4 and the player region R5 is set as the escape destination candidate region. The processing of the escape destination determination module 54 determining the escape destination based on the escape destination candidate region is similar to that of the embodiment.

According to Modification Example (1), the estimated line-of-sight direction is set as the reference direction to avoid the unmanned aerial vehicle 20 from being present in the direction in which the player is estimated to face, to thereby avoid the unmanned aerial vehicle 20 from entering the field of view of the player. Therefore, it is possible to further increase the reliability of avoiding interfering with the player.

(2) Further, for example, in the embodiment and Modification Example (1), there has been described the case of defining the reference direction in the layout information. However, the layout information is only required to be information to be used for determining the escape destination, and the layout information may define a plurality of escape destination candidate positions serving as escape destination candidates.

Figure 10:
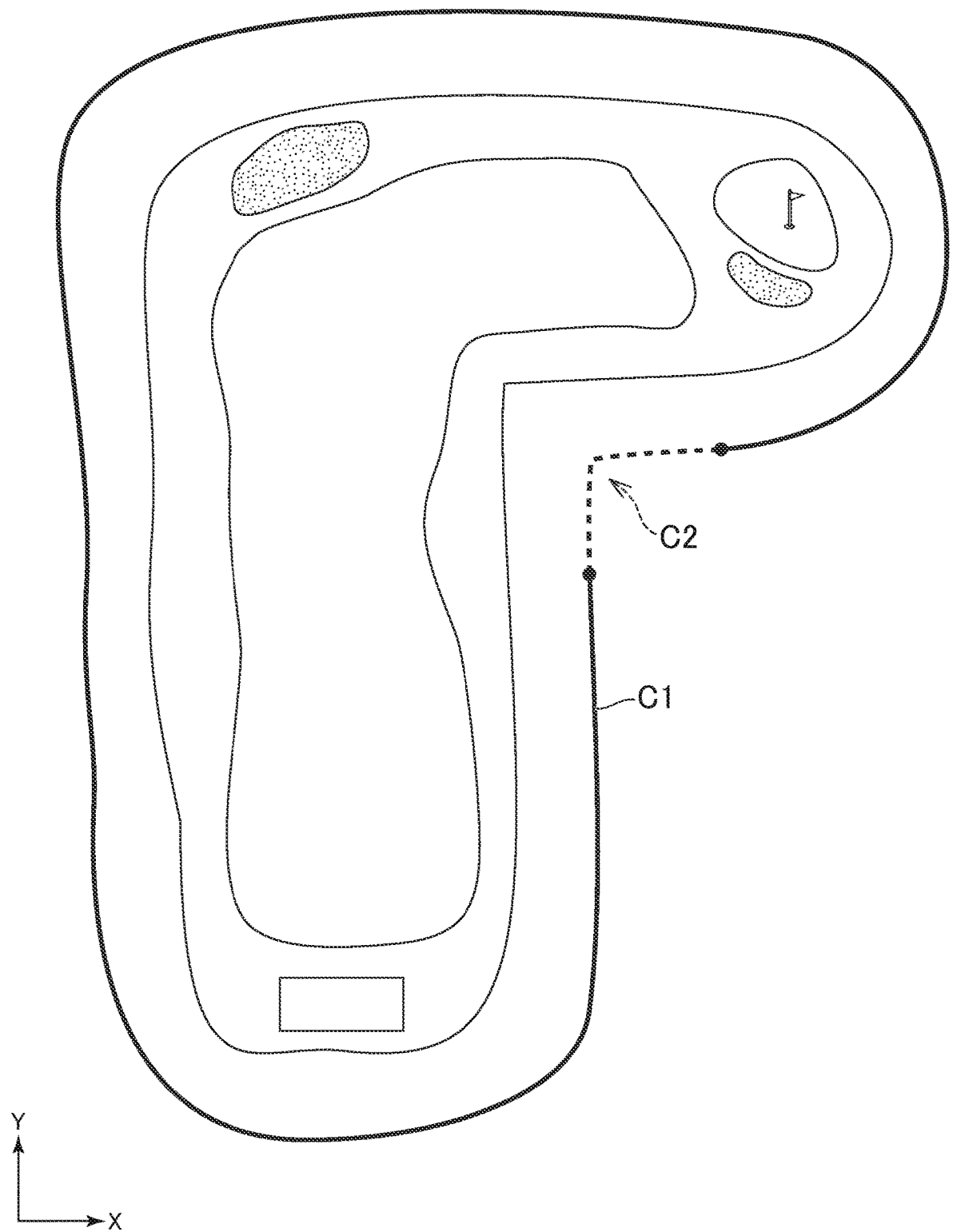
FIG. 10 is a diagram for illustrating an example of layout information in Modification Example (2) of the present invention.

FIG. 10 is a diagram for illustrating an example of layout information in Modification Example (2) of the present invention. As illustrated in FIG. 10, each position on a curve C1, which is drawn to enclose the surroundings of the golf course, serves as an escape destination candidate position. For example, the escape destination candidate position is a position at which the hit ball is estimated not to reach or a position at which the player is estimated not to look. The escape destination candidate position may be designated in advance by, for example, the administrator of the golf course. In the example of FIG. 10, the curve C1 is a line from which a portion corresponding to a dotted line C2 is cut out. As described in the embodiment, the hit ball may pass through the surroundings of the dotted line C2 in order for the player to achieve shortcutting, and thus the portion corresponding to the dotted line C2 is not set as the escape destination candidate position.

The layout information in Modification Example (2) is only required to be information that defines the escape destination candidate position, and is not limited by the manner of defining the escape destination candidate position as in the case of FIG. 10. For example, each of the plurality of escape destination candidate positions may not be on the curve, or the plurality of escape destination candidate positions may be separated from one another. In other cases, for example, each position on the golf course and the escape destination candidate position may be associated with each other in the layout information.

Figure 11:
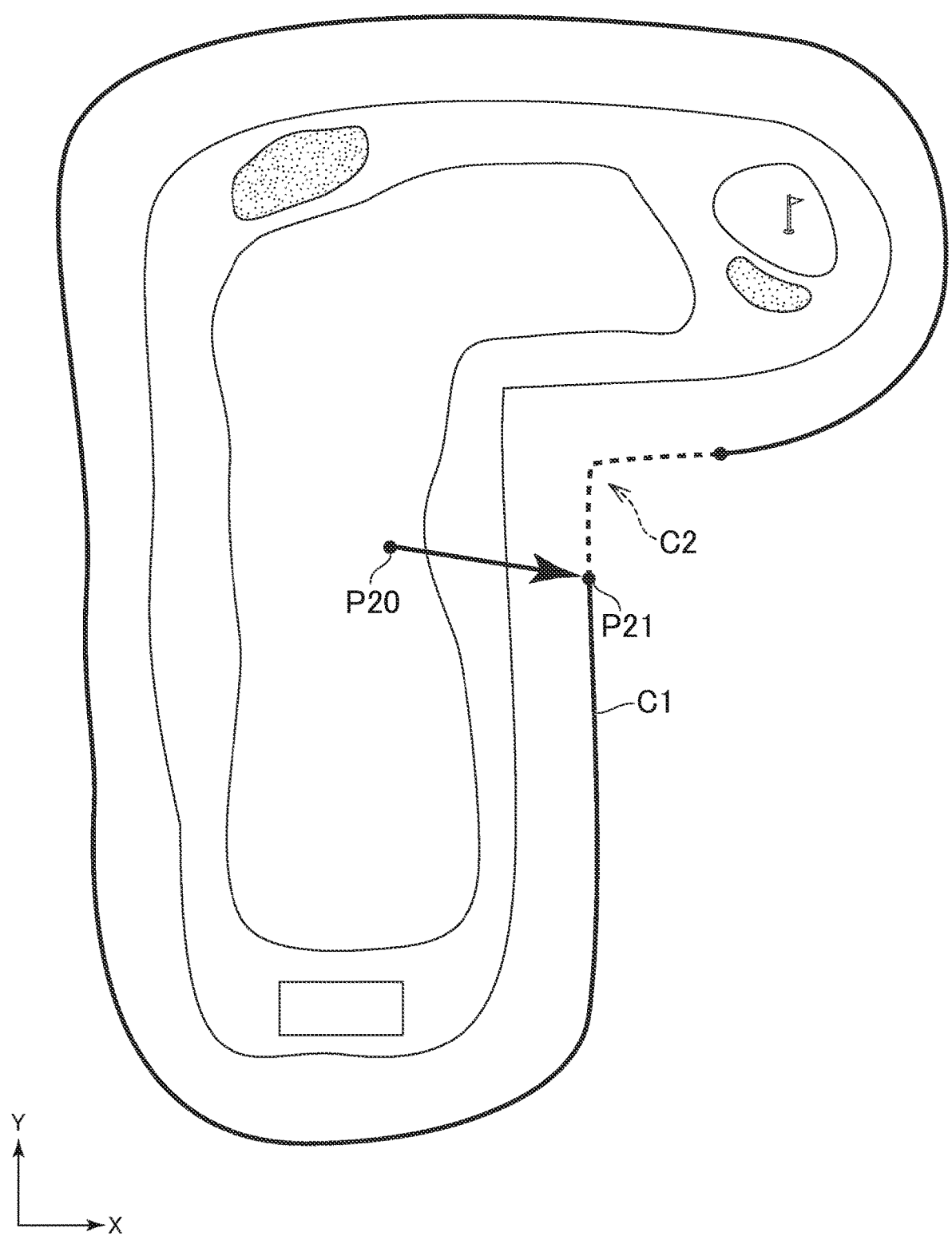
FIG. 11 is a diagram for illustrating a method of determining an escape destination in Modification Example (2).

The escape destination determination module 54 in Modification Example (2) determines, as the escape destination, an escape destination candidate within a predetermined distance from the position of the unmanned aerial vehicle 20 among the plurality of escape destination candidate positions. FIG. 11 is a diagram for illustrating a method of determining an escape destination in Modification Example (2). As illustrated in FIG. 11, first, the escape destination determination module 54 acquires aerial vehicle position information on a position P20 of the unmanned aerial vehicle 20. The aerial vehicle position information is only required to be information capable of identifying the position of the unmanned aerial vehicle 20. Now, a description is given of a case of using the latitude/longitude information detected by the GPS sensor 24B as the aerial vehicle position information. The escape destination determination module 54 transforms the latitude/longitude information of the aerial vehicle position information into coordinates of the layout information. The aerial vehicle position information may be information (e.g., access point information on wireless LAN) on a station that the communicator 23 of the unmanned aerial vehicle 20 wirelessly communicates to/from.

The escape destination determination module 54 identifies an escape destination candidate position within a predetermined distance from the position P20 indicated by the aerial vehicle position information among the plurality of escape destination candidate positions defined in the layout information. When there is one identified escape destination candidate position, the escape destination determination module 54 determines the escape destination candidate position as the escape destination. On the contrary, when there are a plurality of identified escape destination candidate positions, the escape destination determination module 54 selects one from among the plurality of identified escape destination candidate positions to determine the selected escape destination candidate position as the escape destination. This selection method may be implemented in any manner. For example, the escape destination determination module 54 may select one escape destination candidate position at random, or may select an escape destination candidate position P21 closest to the position indicated by the aerial vehicle position information. In the example of FIG. 11, the escape destination candidate position is set to the out-of-bounds area of the golf course, and thus the escape destination may be determined so that a sufficient level of altitude is ensured to avoid collision with an obstacle, for example, a tree.

According to Modification Example (2), the escape destination candidate position is defined in the layout information, and thus it is possible to simplify the processing of determining the escape destination. Further, the administrator of the golf course can designate the escape destination candidate position in advance.

(3) Further, for example, in Modification Example (1), there has been described the case of defining the estimated line-of-sight direction of the player in the layout information. However, the line-of-sight direction of the player may be estimated based on an image photographed by the camera 24A of the unmanned aerial vehicle 20.

The server 10 in Modification Example (3) of the present invention includes the line-of-sight direction estimation module 57. The controller 11 mainly implements the line-of-sight direction estimation module 57. The line-of-sight direction estimation module 57 estimates the line-of-sight direction of the player based on the image photographed by the camera 24A. Various known line-of-sight estimation algorithms are applicable to a method of estimating the line-of-sight direction from the photographed image. For example, the storage 22 may store in advance a template image representing the basic shape of the face direction for each line-of-sight direction. In this case, the line-of-sight direction estimation module 57 conducts template matching on the photographed image and each template image to identify a template image having the highest similarity degree. Then, the line-of-sight direction estimation module 57 acquires the line-of-sight direction associated with the identified template image. The line-of-sight direction indicated by the template image is a relative line-of-sight direction as viewed from the unmanned aerial vehicle 20.

Thus, the line-of-sight direction estimation module 57 estimates an absolute line-of-sight direction of the player based on the direction of the unmanned aerial vehicle 20, which is identified through use of the geomagnetic sensor or gyro sensor of the sensor group 24, and the direction indicated by the template image.

The escape destination determination module 54 determines the escape destination based on the line-of-sight direction estimated by the line-of-sight direction estimation module 57. The method of determining an escape destination may be executed similarly to Modification Example (1) by replacing the description of the "estimated line-of-sight direction" of Modification Example (1) with the "line-of-sight direction estimated by the line-of-sight direction estimation module 57".

According to Modification Example (3), the escape destination is determined based on the line-of-sight direction estimated from the photographed image, and thus it is possible to cause the unmanned aerial vehicle 20 to escape so as not to enter the current field of view of the player.

(4) Further, for example, when the unmanned aerial vehicle 20 moves in a direction of crossing the field of view of the player at the time of escape, the player may be distracted by the unmanned aerial vehicle 20. Thus, the unmanned aerial vehicle 20 may be caused to escape in a direction of the player looking at the unmanned aerial vehicle 20.

The escape destination determination module 54 in Modification Example (4) determines, as the escape destination, a position (e.g., position in escape destination candidate region) that is defined based on the layout information and is in a direction from the participant toward the unmanned aerial vehicle 20.

Figure 12:
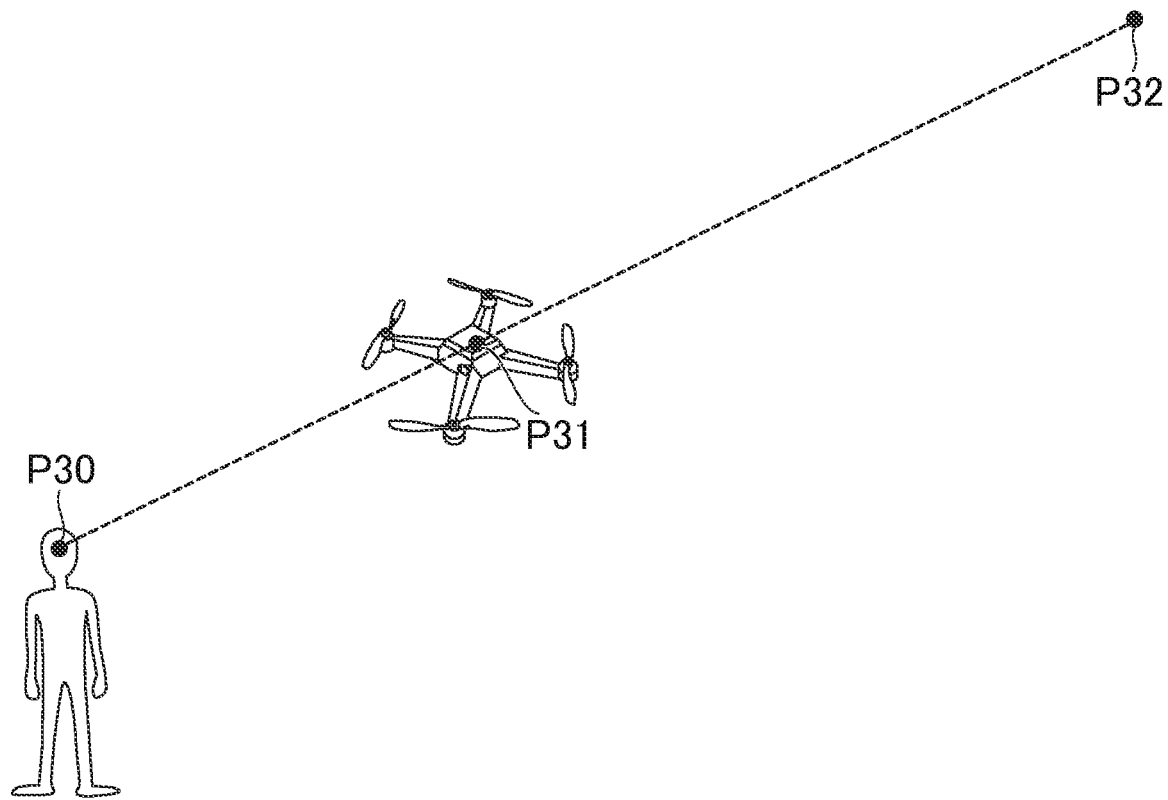
FIG. 12 is a diagram for illustrating a method of causing an unmanned aerial vehicle to escape according to Modification Example (4) of the present invention.

FIG. 12 is a diagram for illustrating a method of causing the unmanned aerial vehicle 20 to escape in Modification Example (4). As illustrated in FIG. 12, the escape destination determination module 54 determines, as the escape destination, a position P32 in a direction from the position P30 indicated by the participant position information toward the position P31 indicated by the aerial vehicle position information. The position P32 may be a position on a straight line from the position P30 toward the position P31, or may be a position within a predetermined distance from this straight line.

According to Modification Example (4), the unmanned aerial vehicle 20 escapes in such a manner as to move farther away from the player, and the amount of vertical and horizontal movement of the unmanned aerial vehicle 20 as viewed from the player becomes smaller, to thereby be able to prevent the player from being distracted at the time of escape of the unmanned aerial vehicle 20.

(5) Further, for example, when the unmanned aerial vehicle 20 escapes windward as viewed from the player, the rotation sound of the propeller is likely to reach the player. Thus, the rotation sound of the propeller may interfere with the player who is addressing the ball unless the unmanned aerial vehicle 20 has escaped to a far place. On the other hand, when there is the unmanned aerial vehicle 20 leeward as viewed from the player, the rotation sound of the propeller is less likely to reach the player, and thus the rotation sound of the propeller may not interfere with the player who is addressing the ball even when the unmanned aerial vehicle 20 has not escaped to too far a place. Therefore, the escape destination of the unmanned aerial vehicle 20 may be determined in consideration of the wind of the golf course.

The server 10 in Modification Example (5) of the present invention includes the wind information acquisition module 58. The controller 11 mainly implements the wind information acquisition module 58. The wind information acquisition module 58 acquires wind information on at least one of the wind direction or wind speed of the golf course. Now, a description is given of a case in which the wind information indicates both of the wind direction and the wind speed, but the wind information may indicate any one of the wind direction and the wind speed. For example, the wind information acquisition module 58 may acquire the wind information from measurement means for measuring wind, or may acquire the wind information from a computer (e.g., server computer of organization providing weather information) configured to provide the wind information.

The measurement means is, for example, a wind speed sensor or an anemometer. The wind speed sensor or the anemometer may be set at any position on the golf course, or may be included in the unmanned aerial vehicle 20 or the participant terminal 30. Further, the unmanned aerial vehicle 20 may estimate the wind information by freely falling from the sky without particularly including a wind speed sensor or an anemometer. In this case, the unmanned aerial vehicle 20 may use, for example, an acceleration sensor of the sensor group 24 to acquire a distance by which the wind blew the unmanned aerial vehicle 20 during free falling, and estimate the wind information based on the distance.

The escape destination determination module 54 determines the escape destination based on the wind information. For example, similarly to the method described in the embodiment and the modification examples, the escape destination determination module 54 determines the escape destination candidate region. This escape destination candidate region is determined without consideration of the wind. Thus, the escape destination determination module 54 corrects the escape destination candidate region based on the wind information. For example, when the unmanned aerial vehicle 20 escapes windward, the escape destination determination module 54 corrects the escape destination candidate region so that the unmanned aerial vehicle 20 moves by a longer distance compared to when the unmanned aerial vehicle 20 escapes leeward. That is, when the unmanned aerial vehicle 20 escapes leeward, the escape destination determination module 54 corrects the escape destination candidate region so that the unmanned aerial vehicle 20 moves by a shorter distance compared to when the unmanned aerial vehicle 20 escapes windward. When the unmanned aerial vehicle 20 escapes in a direction perpendicular to the wind direction, the unmanned aerial vehicle 20 may move by the same movement distance as when there is no wind.

According to Modification Example (5), the escape destination is determined based on the wind information, and thus even when the unmanned aerial vehicle 20 escapes windward, it is possible to prevent the rotation sound of the propeller from reaching the player through wind. Further, when the unmanned aerial vehicle 20 escapes leeward, the rotation sound of the propeller is less likely to reach the player, and thus it is possible to suppress the amount of consumption of the battery or fuel at the time of escape of the unmanned aerial vehicle 20 by reducing the movement distance as much as possible.

(6) Further, for example, in a case where the unmanned aerial vehicle 20 is near landing space, when the player has addressed the ball, the unmanned aerial vehicle 20 may be caused to land so as to avoid interfering with the player.

The escape destination determination module 54 determines whether or not there is landing space under the unmanned aerial vehicle 20, and determines the determined landing space as the escape destination. For example, the escape destination determination module 54 determines whether or not there is landing space based on the layout information. For example, the layout information may designate landing space in advance, or it may be determined whether or not the unmanned aerial vehicle 20 can land depending on the type of an area defined in the layout information. Now, a description is given of a case of an escape destination determination module 54 determining whether or not the unmanned aerial vehicle 20 can land depending on the type of an area.

For example, the escape destination determination module 54 determines that the unmanned aerial vehicle 20 can land when the position of the unmanned aerial vehicle 20 is above a fairway in the sky, and determines that the unmanned aerial vehicle 20 cannot land when the position of the unmanned aerial vehicle 20 is above, for example, an out-of-bounds area or a pond in the sky. When the escape destination determination module 54 determines that the unmanned aerial vehicle 20 can land, the escape destination determination module 54 determines the landing space as the escape destination. This position is only required to be a position under the current location of the unmanned aerial vehicle 20, and may be a ground surface right under the current location or within a predetermined distance from a position right under the current location. When the escape destination determination module 54 determines that the unmanned aerial vehicle 20 cannot land at the current location, the escape destination determination module 54 may determine the escape destination similarly to the method described in the embodiment and Modification Examples (1) to (5).

According to Modification Example (6) of the present invention, it is possible to avoid interfering with the player by landing the unmanned aerial vehicle 20. For example, rotation of the propeller stops when the unmanned aerial vehicle 20 has landed, and thus it is possible to prevent the player from being distracted due to the rotation sound of the propeller.

(7) Further, for example, when the escape destination is determined from among escape destination candidate regions, priorities may be set to a plurality of escape directions, and the unmanned aerial vehicle 20 may escape in an escape direction with the highest priority. The escape destination determination module 54 in Modification Example (7) of the present invention determines escape directions that enable escape of the unmanned aerial vehicle 20 from among the plurality of escape directions with priorities, and determines the escape destination based on an escape direction with the highest priority from among the escape directions that are determined to enable escape of the unmanned aerial vehicle 20.

FIG. 13 is a table for showing the priority of an escape direction. The priority shown in FIG. 13 may be stored in the data storage 50 in advance. For example, in order from the escape direction with the highest priority, the escape destination determination module 54 determines, based on the layout information, whether or not the unmanned aerial vehicle 20 can escape in a direction associated with each priority. When there is an obstacle in the subject escape direction, the escape destination determination module 54 determines that the unmanned aerial vehicle 20 cannot escape. When the escape destination determination module 54 determines that the unmanned aerial vehicle 20 can escape in the subject escape direction, the escape destination determination module 54 determines a position in the subject escape direction as the escape destination. On the contrary, when the escape destination determination module 54 determines that the unmanned aerial vehicle 20 cannot escape in the subject escape direction, the escape destination determination module 54 determines whether or not the unmanned aerial vehicle 20 can escape in an escape destination with the next priority. After that, the escape destination determination module repeats the determination until an escape direction that enables escape is found.

Although there has been described the case of determining whether or not the unmanned aerial vehicle 20 can escape in the subject escape direction in order from the escape direction with the highest priority, the order of determination is not particularly limited thereto. The escape destination determination module 57 may determine whether or not the unmanned aerial vehicle 20 can escape in the subject escape direction in order from the escape direction with the lowest priority, or for all the escape directions. The escape destination determination module 57 is only required to determine the escape destination based on the escape direction with the highest priority from among escape directions that enable escape.

According to Modification Example (7), the unmanned aerial vehicle 20 can escape in an escape direction with a high priority, and thus it is possible to cause the unmanned aerial vehicle 20 to escape in a direction that causes less interference among directions that enable escape.

(8) Further, for example, in Modification Example (7), when it is determined that there is no escape direction that enables escape, movement of the unmanned aerial vehicle 20 may interfere with the player or may result in collision between the unmanned aerial vehicle 20 and an obstacle contrary to the intention. Thus, in that case, the unmanned aerial vehicle 20 may be caused to stay at the current location. When the escape destination determination module determines that there is no escape direction that enables escape, the escape module in Modification Example (8) of the present invention causes the unmanned aerial vehicle 20 to stay at the current location. In this case, the unmanned aerial vehicle 20 performs hovering control so as to stay at the current location.

According to Modification Example (8), when there is no escape direction, the unmanned aerial vehicle 20 stay at the current location, to thereby be able to suppress the degree of interfering with the player compared to a case of interfering with the player contrary to the intention by moving unnecessarily.

(9) Further, for example, any two or more of Modification Examples (1) to (8) may be combined with each other.

Further, for example, in the embodiment, the state determination module 55 determines the progress state based on an image photographed by the unmanned aerial vehicle 20. However, the state determination module 55 may use other situations detectable by the unmanned aerial vehicle 20. For example, the state determination module 55 may determine the progress state based on the sound detected by the unmanned aerial vehicle 20. In this case, when the microphone of the sensor group 24 detects a predetermined sound, the state determination module 55 determines that the given progress state has been entered. In other cases, for example, the state determination module 55 may determine the progress state based on an operation input to a terminal, for example, the participant terminal 30. In this case, a human or player who manages progress performs a predetermined operation on a terminal, and the state determination module 55 determines that the given progress state has been entered when the predetermined operation is input to the terminal. Further, for example, the state determination module 55 may determine the progress state based on the participant position information. In this case, the state determination module 55 determines that the given progress state has been entered when the position indicated by the participant position information is in a predetermined region. Further, for example, the state determination module 55 may determine the progress state based on the current time. In this case, the state determination module 55 determines that the given progress state has been entered when the current time reaches a predetermined time.

Further, for example, there has been described the case of causing the unmanned aerial vehicle 20 to escape when the state determination module 55 determines that the given state has been entered, but the timing of causing the unmanned aerial vehicle 20 to escape is not limited thereto. For example, the processing of the state determination module 55 may be omitted, and the escape module 56 may cause the unmanned aerial vehicle 20 to escape to the escape destination when the unmanned aerial vehicle 20 has photographed the player with the camera 24A, or has photographed the player with the camera 24A for a fixed period of time.

Further, for example, in the embodiment, there has been described the case of providing information to the audience and viewers, but information may be provided to the player. Further, there has been described the case of providing the image photographed by the unmanned aerial vehicle 20, but information to be provided is not limited to images. Information may be provided based on the information acquired by the unmanned aerial vehicle 20. For example, when the unmanned aerial vehicle 20 can detect information on wind (refer to Modification Example (5)) above the golf course in the sky, information may be provided based on the wind information detected by the unmanned aerial vehicle 20 at the movement destination. In this case, the wind information itself may be provided to, for example, the player and audience, or the server 10 or the unmanned aerial vehicle 20 may calculate a recommended trajectory for hitting a shot at a position indicated by the participant position information based on the layout information and wind information, and provide the calculation result to, for example, the player and audience. The recommended trajectory may be calculated so that the falling point of the ball is in a predetermined region, for example, on the fairway (namely, region excluding, for example, out-of-bounds area and bunker), through use of a known golf simulator. The recommended trajectory may be provided as images or voices, or may be provided as the position of the unmanned aerial vehicle 20. For example, the unmanned aerial vehicle 20 may provide the recommended trajectory by moving along the recommended trajectory for presentation or moving to any position on the recommended trajectory and hovering at the position. In this case, when the player has addressed the ball and the unmanned aerial vehicle 20 stays at the current location, the unmanned aerial vehicle 20 may be hit by the ball or enter the fields of view of participants. Thus, similarly to the method described in the embodiment, when the state determination module 55 determines that a predetermined state has been entered, the escape module 56 causes the unmanned aerial vehicle 20 to escape to the escape destination from the current location.

In other cases, for example, when the unmanned aerial vehicle 20 can detect sound, sound detected at the movement destination may be provided. Further, when the unmanned aerial vehicle 20 can detect the weather and temperature, the weather and temperature detected at the movement destination may be provided.

Further, for example, in the embodiment, the description has been given of the case in which the unmanned aerial vehicle 20 photographs the situation of the golf competition, but the unmanned aerial vehicle escape system 1 according to the present invention can also be applied to other competitions. For example, the unmanned aerial vehicle escape system 1 can also be applied to a case in which the unmanned aerial vehicle 20 photographs the situation of a ski jump competition. In this case, the unmanned aerial vehicle 20 photographs the situation of a player at the start position of a ski jumping hill. Then, when the player gets ready to start, the unmanned aerial vehicle 20 escapes in a direction defined based on the layout information. The situation of the player getting ready to start is identified by, for example, the color of a signal serving as a start sign. In this case, the layout of the competition venue is defined in the layout information. For example, arrangement of objects that may be obstacles for the unmanned aerial vehicle 20, such as a ski lift, an iron frame, and an illumination lamp, is different depending on the ski jumping hill, and thus arrangement of those objects is defined in the layout information. In other cases, for example, the unmanned aerial vehicle escape system 1 can also be applied to a case in which the unmanned aerial vehicle 20 photographs the situation of an event venue other than a competition.

Further, for example, each of the functions described above may be implemented by any one of the computers of the unmanned aerial vehicle escape system 1, and the functions described as being implemented by the server 10 may be implemented by the unmanned aerial vehicle 20 or the participant terminal 30. Similarly, the functions described as being implemented by the unmanned aerial vehicle 20 may be implemented by the server 10 or the participant terminal 30. Further, the functions other than the participant position information acquisition module 51, the movement instruction module 52, the layout information acquisition module 53, the escape destination determination module 54, and the escape module 56 may be omitted among the functions described above.

The invention claimed is:

1. An unmanned aerial vehicle escape system, comprising at least one processor configured to:
   acquire participant position information on a position of a participant in a venue of a competition or an event;
   instruct an unmanned aerial vehicle to move to an initial position based on the participant position information;
   acquire layout information on a layout of the venue;
   wherein the layout information associates each of a plurality of positions in the venue with a reference direction for determining a destination;
   wherein the position of the participant is among the plurality of positions in the venue associated with a reference direction for determining the destination;
   determine the destination of the unmanned aerial vehicle based on the participant position information, the layout information, and the reference direction associated with the position of the participant;
   cause the unmanned aerial vehicle to move to the destination from the initial position, and
   wherein the layout information includes a plurality of reference directions,
   wherein each of the plurality of the reference directions depends on a position among the plurality of positions in the venue, and
   wherein each of the plurality of positions in the venue is previously associated with at least one reference direction of the plurality of reference directions.

2. The unmanned aerial vehicle escape system according to claim 1,
   wherein a competition in which the participant hits an object is held in the venue,
   wherein each of the plurality of reference directions includes an estimated flying-out direction in which the object is estimated to fly out from each position in the venue, and
   wherein the at least one processor is configured to determine the destination further based on the estimated flying-out direction associated with the position of the participant.

3. The unmanned aerial vehicle escape system according to claim 1,
   wherein each of the plurality of reference directions includes an estimated line-of-sight direction in which the participant is estimated to look at each position in the venue, and
   wherein the at least one processor is configured to determine the destination further based on the estimated line-of-sight direction associated with the position of the participant.

4. The unmanned aerial vehicle escape system according to claim 1,
   wherein the layout information defines a plurality of destination candidate positions serving as destination candidates, and
   wherein the at least one processor is configured to determine, as the destination, a destination candidate within a predetermined distance from the initial position of the unmanned aerial vehicle among the plurality of destination candidate positions.

5. The unmanned aerial vehicle escape system according to claim 1, wherein the at least one processor is configured to determine, as the destination, a position that is defined based on the layout information and is a predetermined distance or more away from the position of the participant.

6. The unmanned aerial vehicle escape system according to claim 1,
   wherein the unmanned aerial vehicle includes a camera configured to photograph the participant,
   wherein the at least one processor is configured to:
   estimate a line-of-sight direction of the participant based on an image photographed by the camera, and
   determine the destination based on the line-of-sight direction.

7. The unmanned aerial vehicle escape system according to claim 1, wherein the at least one processor is configured to determine, as the destination, a position that is defined based on the layout information and is in a direction from the participant toward the unmanned aerial vehicle.

8. The unmanned aerial vehicle escape system according to claim 1, wherein the at least one processor is configured to:
   acquire wind information on at least one of a wind direction or wind speed of the venue, and
   determine the destination based on the wind information.

9. The unmanned aerial vehicle escape system according to claim 1, wherein the at least one processor is configured to determine whether there is landing space under the unmanned aerial vehicle, and when there is landing space, select the landing space as the destination.

10. The unmanned aerial vehicle escape system according to claim 1, wherein the at least one processor is configured to determine escape directions that enable escape of the unmanned aerial vehicle from among a plurality of escape directions with priorities, and determine the destination based on an escape direction with a highest priority from among the escape directions that are determined to enable escape of the unmanned aerial vehicle.

11. The unmanned aerial vehicle escape system according to claim 10, wherein the at least one processor is configured to cause the unmanned aerial vehicle to stay at a current location when it is determined that there is no escape direction that enables escape of the unmanned aerial vehicle.

12. The unmanned aerial vehicle escape system according to claim 1, wherein the at least one processor is configured to:
determine whether the competition or the event has entered a given progress state based on at least one of a state detected by the unmanned aerial vehicle, an operation input to a terminal, the participant position information, or a current time, and
cause the unmanned aerial vehicle to move when it is determined that the given progress state has been entered.

13. The unmanned aerial vehicle escape system according to claim 1,
wherein the layout information includes a first position associated with a first reference direction and a second position associated with a second reference direction,
wherein the at least one processor determines the destination based on the first reference direction when the position of the participant is the first position, and
wherein the at least one processor determines the destination based on the second reference direction when the position of the participant is the second position.

14. The unmanned aerial vehicle escape system according to claim 1,
wherein the at least one processor determines a region based on the participant position information and the reference direction associated with the position of the participant, and
wherein the at least one processor determines the destination based on the region.

15. The unmanned aerial vehicle escape system according to claim 14, wherein the destination is a position outside the region.

16. An unmanned aerial vehicle escape method, comprising:
acquiring participant position information on a position of a participant in a venue of a competition or an event;
instructing an unmanned aerial vehicle to move to an initial position based on the participant position information;
acquiring layout information on a layout of the venue;
wherein the layout information associates each of a plurality of positions in the venue with a reference direction for determining a destination,
wherein the position of the participant is among the plurality of positions in the venue associated with a reference direction for determining the destination;
determining the destination of the unmanned aerial vehicle based on the participant position information, the layout information, and the reference direction associated with the position of the participant; and
causing the unmanned aerial vehicle to move to the destination from the initial position, and
wherein the layout information includes a plurality of reference directions,
wherein each of the plurality of the reference directions depends on a position among the plurality of positions in the venue, and
wherein each of the plurality of positions in the venue is previously associated with at least one reference direction of the plurality of reference directions.

17. A non-transitory computer-readable information storage medium having stored thereon a program for causing a computer to:
acquire participant position information on a position of a participant in a venue of a competition or an event;
instruct an unmanned aerial vehicle to move to an initial position based on the participant position information;
acquire layout information on a layout of the venue;
wherein the layout information associates each of a plurality of positions in the venue with a reference direction for determining a destination;
wherein the position of the participant is among the plurality of positions in the venue associated with a reference direction for determining the destination;
determine the destination of the unmanned aerial vehicle based on the participant position information, the layout information, and the reference direction associated with the position of the participant;
cause the unmanned aerial vehicle to move to the destination from the initial position; and
wherein the layout information includes a plurality of reference directions,
wherein each of the plurality of the reference directions depends on a position among the plurality of positions in the venue, and
wherein each of the plurality of positions in the venue is previously associated with at least one reference direction of the plurality of reference directions.

* * * * *